US010414887B2

(12) United States Patent
Ye et al.

(10) Patent No.: US 10,414,887 B2
(45) Date of Patent: Sep. 17, 2019

(54) SUPPORTED CATALYST SYSTEMS AND METHODS OF USING SAME

(71) Applicant: ExxonMobil Chemical Patents Inc., Baytown, TX (US)

(72) Inventors: Xuan Ye, Houston, TX (US); Matthew W. Holtcamp, Huffman, TX (US); Gregory S. Day, College Station, TX (US); Matthew S. Bedoya, Humble, TX (US); David F. Sanders, Houston, TX (US); Laughlin G. McCullough, League City, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 15/242,179

(22) Filed: Aug. 19, 2016

(65) Prior Publication Data
US 2017/0096506 A1   Apr. 6, 2017

Related U.S. Application Data

(60) Provisional application No. 62/236,727, filed on Oct. 2, 2015.

(51) Int. Cl.
| | |
|---|---|
| *C08F 4/76* | (2006.01) |
| *C08F 4/64* | (2006.01) |
| *C08J 5/18* | (2006.01) |
| *C08F 210/16* | (2006.01) |
| *C08F 4/659* | (2006.01) |
| *C08F 4/6592* | (2006.01) |

(52) U.S. Cl.
CPC .............. *C08J 5/18* (2013.01); *C08F 210/16* (2013.01); *C08F 4/6592* (2013.01); *C08F 4/65908* (2013.01); *C08F 4/65912* (2013.01); *C08F 4/65916* (2013.01); *C08F 4/65925* (2013.01); *C08J 2323/08* (2013.01)

(58) Field of Classification Search
CPC .... C08F 4/02; C08F 4/60148; C08F 4/64148; C08F 10/00; C08F 210/10
See application file for complete search history.

(56) References Cited

U.S. PATENT DOCUMENTS

| | | | |
|---|---|---|---|
| 4,638,020 A | 1/1987 | Christenson et al. | |
| 4,728,705 A | 3/1988 | Nestlerode et al. | |
| 5,290,745 A | 3/1994 | Jorgensen et al. | |
| 5,306,350 A | 4/1994 | Hoy et al. | |
| 5,308,811 A | 5/1994 | Suga et al. | |
| 5,604,172 A | 2/1997 | Wagner et al. | |
| 5,716,558 A | 2/1998 | Nielsen et al. | |
| 5,830,820 A | 11/1998 | Yano et al. | |
| 5,889,128 A | 3/1999 | Schrock et al. | |
| 5,928,982 A | 7/1999 | Suga et al. | |
| 5,973,084 A | 10/1999 | Suga et al. | |
| 6,103,657 A | 8/2000 | Murray | |
| 6,271,325 B1 | 8/2001 | McConville et al. | |
| 6,274,684 B1* | 8/2001 | Loveday ................. C08F 10/00 526/114 |
| 6,333,423 B1 | 12/2001 | Kol et al. | |
| 6,368,999 B1* | 4/2002 | Speca .................. C08F 4/65916 502/104 |
| 6,399,535 B1 | 6/2002 | Shih et al. | |
| 6,531,552 B2 | 3/2003 | Nakano et al. | |
| 6,559,090 B1 | 5/2003 | Shih et al. | |
| 6,596,827 B2 | 7/2003 | Kol et al. | |
| 6,664,348 B2 | 12/2003 | Speca | |
| 6,734,131 B2 | 5/2004 | Shih et al. | |
| 6,844,389 B2 | 1/2005 | Mehta et al. | |
| 6,900,321 B2 | 5/2005 | Boussie et al. | |
| 6,943,224 B2 | 9/2005 | Shih | |
| 6,982,236 B2 | 1/2006 | Wenzel et al. | |
| 7,183,348 B2 | 2/2007 | Reinking et al. | |
| 7,220,695 B2 | 5/2007 | Casty et al. | |
| 7,355,058 B2 | 4/2008 | Luo et al. | |
| 7,619,047 B2 | 11/2009 | Yang et al. | |
| 7,754,840 B2 | 7/2010 | Loveday et al. | |
| 7,973,116 B2 | 7/2011 | Hagadorn et al. | |
| 8,071,701 B2 | 12/2011 | Klosin et al. | |
| 8,080,613 B2 | 12/2011 | Moad et al. | |
| 8,110,518 B2 | 2/2012 | Marin et al. | |
| 8,138,113 B2 | 3/2012 | Yang et al. | |
| 8,378,129 B2 | 2/2013 | Bhise et al. | |
| 8,435,914 B2 | 5/2013 | Kao et al. | |
| 8,501,659 B2 | 8/2013 | Johns | |
| 8,575,284 B2 | 11/2013 | Luo et al. | |
| 8,791,217 B2 | 7/2014 | Hlavinka et al. | |

(Continued)

FOREIGN PATENT DOCUMENTS

| | | |
|---|---|---|
| EP | 511665 A1 | 11/1992 |
| EP | 1 160 261 A1 | 12/2001 |

(Continued)

OTHER PUBLICATIONS

U.S. Appl. No. 61/779,435, filed Mar. 13, 2013, Holtcamp et al.
U.S. Appl. No. 62/168,302, filed May 29, 2015, Holtcamp et al.
U.S. Appl. No. 62/222,935, filed Sep. 24, 2015, Holtcamp et al.
U.S. Appl. No. 62/236,701, filed Oct. 2, 2015, Atienza et al.
U.S. Appl. No. 62/736,720, filed Oct. 2, 2015, Atienza et al.
Barroso et al., "Chiral Diamine Bis(phenolate) TiIV and ZrIV Complexes—Synthesis, Structures and Reactivity," Eur. J. Inorg. Chem., 2011, pp. 4277-4290.
Bucheli et al., "Spherical Clay Conglomerates: A Novel Stationary Phase for Solid-Phase Extraction and 'Reversed-Phase' Liquid Chromatography," Analytical Chemistry, vol. 71(11), Jun. 1, 1999, pp. 2171-2178.

(Continued)

*Primary Examiner* — Rip A Lee

(57) ABSTRACT

A catalyst system including the reaction product of a fluorided support (such as a fluorided silica support) that preferably has not been calcined at a temperature of 400° C. or more, an activator and at least a first transition metal catalyst compound; methods of making such catalyst systems, polymerization processes using such catalyst systems and polymers made therefrom.

37 Claims, No Drawings

(56) References Cited

U.S. PATENT DOCUMENTS

| | | |
|---|---|---|
| 8,907,032 B2 | 12/2014 | Kol et al. |
| 8,937,137 B2 | 1/2015 | Holtcamp et al. |
| 8,952,114 B2 | 2/2015 | Giesbrecht et al. |
| 8,957,171 B2 | 2/2015 | Giesbrecht et al. |
| 8,957,172 B2 | 2/2015 | Giesbrecht et al. |
| 9,079,991 B2 | 7/2015 | Ker et al. |
| 9,120,879 B2 | 9/2015 | Giesbrecht et al. |
| 9,150,676 B2 | 10/2015 | Kol et al. |
| 9,193,813 B2 | 11/2015 | Kol et al. |
| 9,200,099 B2 | 12/2015 | Kol et al. |
| 9,200,100 B2 | 12/2015 | Kol et al. |
| 9,290,589 B2 | 3/2016 | Evans et al. |
| 9,731,283 B2 | 8/2017 | Cunningham et al. |
| 9,745,327 B2 | 8/2017 | Atienza et al. |
| 9,975,973 B2 | 5/2018 | Atienza et al. |
| 9,982,067 B2 | 5/2018 | Holtcamp et al. |
| 9,982,076 B2 | 5/2018 | Ye et al. |
| 9,994,658 B2 | 6/2018 | Atienza et al. |
| 10,000,593 B2 | 6/2018 | Ye et al. |
| 2002/0019503 A1 | 2/2002 | Kol et al. |
| 2002/0123582 A1 | 9/2002 | Speca |
| 2002/0142912 A1 | 10/2002 | Boussie et al. |
| 2003/0027950 A1 | 2/2003 | Uchino et al. |
| 2003/0096698 A1 | 5/2003 | Shih et al. |
| 2005/0148743 A1 | 7/2005 | Casty et al. |
| 2006/0293470 A1 | 12/2006 | Cao et al. |
| 2007/0191215 A1 | 8/2007 | Muruganandam et al. |
| 2010/0227990 A1 | 9/2010 | Kuhlman et al. |
| 2012/0027017 A1 | 2/2012 | Rai et al. |
| 2012/0059134 A1 | 3/2012 | Yang et al. |
| 2012/0271017 A1 | 10/2012 | Rix et al. |
| 2013/0035463 A1* | 2/2013 | Cann ............... C08F 10/02 526/226 |
| 2013/0131294 A1 | 5/2013 | Hagadorn et al. |
| 2013/0172498 A1 | 7/2013 | Hlavinka et al. |
| 2014/0031504 A1 | 1/2014 | Jacobsen et al. |
| 2014/0039137 A1 | 2/2014 | Giesbrecht et al. |
| 2014/0039138 A1 | 2/2014 | Giesbrecht et al. |
| 2014/0039139 A1 | 2/2014 | Giesbrecht et al. |
| 2014/0094533 A1 | 4/2014 | Karjala et al. |
| 2014/0121341 A1 | 5/2014 | Holtcamp et al. |
| 2014/0127427 A1 | 5/2014 | Vantomme et al. |
| 2014/0128557 A1 | 5/2014 | Giesbrecht et al. |
| 2014/0221587 A1 | 8/2014 | Hagadorn et al. |
| 2014/0275454 A1 | 9/2014 | Holtcamp et al. |
| 2015/0141601 A1 | 5/2015 | Hagadorn et al. |
| 2015/0329652 A1 | 11/2015 | Hlavinka |
| 2016/0032027 A1 | 2/2016 | St. Jean et al. |
| 2017/0088641 A1 | 3/2017 | Holtcamp et al. |
| 2017/0096507 A1 | 4/2017 | Atienza et al. |
| 2017/0096508 A1 | 4/2017 | Ye et al. |
| 2017/0096509 A1 | 4/2017 | Atienza et al. |
| 2017/0096510 A1 | 4/2017 | Ye et al. |
| 2017/0096511 A1 | 4/2017 | Atienza et al. |
| 2017/0320971 A1 | 11/2017 | Holtcamp et al. |
| 2017/0368810 A1 | 12/2017 | Zacarias et al. |
| 2018/0072823 A1 | 3/2018 | Ye et al. |
| 2018/0079845 A1 | 3/2018 | Doufas et al. |
| 2018/0134828 A1 | 5/2018 | Doufas et al. |
| 2018/0171040 A1 | 6/2018 | Ye et al. |
| 2018/0194872 A1 | 7/2018 | Holtcamp et al. |

FOREIGN PATENT DOCUMENTS

| | | |
|---|---|---|
| EP | 0 849 292 B1 | 8/2002 |
| EP | 197242 | 9/2008 |
| EP | 1964860 | 7/2017 |
| JP | 1995033814 A | 2/1995 |
| JP | 2011089019 A | 5/2011 |
| JP | 2013124302 A | 6/2013 |
| WO | 97/48743 A1 | 12/1997 |
| WO | 1998/028350 | 7/1998 |
| WO | 01/42320 A1 | 6/2001 |
| WO | 02/088198 A1 | 11/2002 |
| WO | 2004/106390 A2 | 12/2004 |
| WO | 2005/075525 | 8/2005 |
| WO | 2005/090427 | 9/2005 |
| WO | 2006/036748 A2 | 4/2006 |
| WO | 2007/018804 A1 | 2/2007 |
| WO | 2008/042078 | 4/2008 |
| WO | 2012/033670 A1 | 3/2012 |
| WO | 2012/098521 A1 | 7/2012 |
| WO | 2012/134614 A1 | 10/2012 |
| WO | 2012/134615 A1 | 10/2012 |
| WO | 2012/158260 A1 | 11/2012 |
| WO | 2013/028283 | 2/2013 |
| WO | 2013/040276 A1 | 3/2013 |
| WO | 2014/143202 A1 | 9/2014 |
| WO | 2014/149361 A1 | 9/2014 |
| WO | 2015/088819 A1 | 6/2015 |
| WO | 2015/195189 | 12/2015 |
| WO | 2016/094866 | 6/2016 |
| WO | 2017/039994 | 3/2017 |
| WO | 2017/039995 | 3/2017 |
| WO | 2018/075243 | 4/2018 |
| WO | 2018/075245 | 4/2018 |

OTHER PUBLICATIONS

Busico et al., "Block Copolymers of Highly Isotactic Polypropylene via Controlled Ziegler-Natta Polymerization," Macromolecules, 2004, vol. 37, pp. 8201-8203.

Cipullo et al., "Improving the Behavior of Bis(phenoxyamine) Group 4 Metal Catalysts for Controlled Alkene Polymerization," Macromolecules, 2009, vol. 42, pp. 3869-3872.

Groysman et al., "From THF to Furan: Activity Tuning and Mechanistic Insight via Sidearm Donor Replacement in Group IV Amine Bis(phenolate) Polymerization Catalysts," Organometallics, 2003, vol. 22, pp. 3013-3015.

Groysman et al., "Diverse Structure-Activity Trends in Amine Bis(phenolate) Titanium Polymerization Catalysts," Organometallics, 2004, vol. 23, pp. 5291-5299.

Meurs et al., "Polyethylene Chain Growth on Zinc Catalyzed by Olefin Polymerization Catalysts: A Comparative Investigation of Highly Active Catalyst Systems across the Transition Series ," J. Am. Chem. Soc., 2005, vol. 127, pp. 9913-9923.

Reybuck et al., "Amine Bis(phenolate) Zirconium Complexes: Influence of Ligand Structure and Cocatalyst on Copolymerization Behaivor," Macromolecules, 2005, vol. 38, pp. 2552-2558.

Su et al., "Oxo-Bridged Bimetallic Group 4 Complexes Bearing Amine-Bis(benzotriazole phenolate) Derivatives as Bifunctional Catalysts for Ring-Opening Polymerization of Lactide and Copolymerization of Carbon Dioxide with Cyclohexene Oxide," Organometallics, 2014, vol. 33, pp. 7091-7100.

Tshuva et al., "[ONXO]-Type Amine Bis(phenolate) Zirconium and Hafnium Complexes as Extremely Active 1-Hexene Polymerization Catalysts," Organometallics, 2002, vol. 21, pp. 662-670.

Valente et al., "Coordinative Chain Transfer Polymerization," Chemical Reviews, 2013, vol. 113, pp. 3836-3857.

U.S. Appl. No. 62/149,799, filed Apr. 20, 2015, Xuan Ye et al.
U.S. Appl. No. 62/149,814, filed Apr. 20, 2015, Xuan Ye et al.
U.S. Appl. No. 62/236,691, filed Oct. 2, 2015, Xuan Ye et al.
U.S. Appl. No. 62/236,697, filed Oct. 2, 2015, Xuan Ye et al.
U.S. Appl. No. 62/236,712, filed Oct. 2, 2015, Crisita C.H. Atienza et al.

Gibson et al., "Advances in Non-Metallocene Olefin Polymerization Catalysis," Chemical Review (2003) vol. 103, pp. 283-315.

U.S. Appl. No. 62/332,940, filed May 6, 2016, Holtcamp et al.
PCT/US2017/055131 filed Oct. 4, 2017 Hule et al.
U.S. Appl. No. 62/410,173, filed Oct. 19, 2016, Hule et al.
U.S. Appl. No. 15/558,067, filed Apr. 15, 2016, Holtcamp et al.

Lang, L. et al. (1999) "Synthesis of Group 4 Complexes that Contain the Diamidoamine Ligands, [(2,4,6-Me3,C6,H2,NCH2,CH2)2NR]2-([Mes2N2NR]2; R=H or CH3), and Polymerization of 1-Hexene by Activated [Mes2N2NR]ZrMe2 Complexes," J. Am. Chem., v121(24), pp. 5797-5798.

* cited by examiner

SUPPORTED CATALYST SYSTEMS AND METHODS OF USING SAME

PRIORITY AND CROSS REFERENCE TO RELATED APPLICATIONS

This invention claims priority to and the benefit of U.S. Ser. No. 62/236,727, filed Oct. 2, 2015, and is related to U.S. Ser. No. 62/236,691, filed Oct. 2, 2015 and U.S. Ser. No. 62/236,697, filed Oct. 2, 2015, the disclosures of which are incorporated herein by reference.

FIELD OF THE INVENTION

This invention relates to supported Salan catalysts, processes utilizing such catalysts, and polymers produced thereby.

BACKGROUND OF THE INVENTION

Supported olefin polymerization catalysts are of great use in industry. Hence, there is interest in finding new supported catalyst systems that increase the commercial usefulness of the catalyst and allow the production of polymers having improved properties.

There is a need in the art for new and improved supported catalysts and catalyst systems to obtain new and improved polyolefins, polymerization processes, and the like. Accordingly, there is a need in the art for new and improved supported catalyst systems for the polymerization of olefins, in order to achieve specific polymer properties such as enhanced molecular weight.

SUMMARY OF THE INVENTION

The instant disclosure is related at least in part to the discovery that certain catalyst systems that include at least one catalyst compound in combination with an activator and fluorided silica support, e.g., spray-dried catalyst systems, may have surprising or beneficial performance in the manufacture of polymers, particularly olefin polymers, e.g., ethylene polymers and propylene polymers. Embodiments described herein are directed to such catalyst systems, processes for the preparation of the catalyst systems, processes for the polymerization of olefins using such supported catalyst systems, polymers made using such catalyst systems, and making articles, such as films, using such catalyst systems. This invention relates to a catalyst system comprising the reaction product of a fluorided support, an activator and at least a first catalyst compound of Formula I:

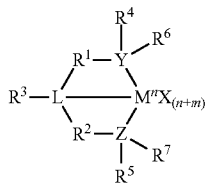

Formula I wherein:
M is a group 3 to 14 metal;
each X is independently an anionic leaving group;
n is the formal oxidation state of M;
m is the formal charge of the ligand comprising Y, Z, and L;
Y is a group 15 element;
Z is a group 15 element;
L is a group 15 or 16 element;
$R^1$ and $R^2$ are independently a $C_1$ to $C_{20}$ hydrocarbon group, a heteroatom-containing group, such as silicon, germanium, tin, lead, or phosphorus;
$R^1$ and $R^2$ may also be interconnected to each other;
$R^3$ is absent, or is hydrogen, a group 14 atom-containing group, a halogen, or a heteroatom containing group;
$R^4$ and $R^5$ are independently an aryl group, a substituted aryl group, a cyclic alkyl group, a substituted cyclic alkyl group, or a multiple ring system; and
$R^6$ and $R^7$ are independently absent, hydrogen, halogen, a heteroatom, a hydrocarbyl group, or a heteroatom-containing group.

In another aspect, embodiments of the invention provide polymerization processes comprising contacting one or more olefins with a catalyst system described herein at a temperature, a pressure, and for a period of time sufficient to produce a polyolefin.

In still another aspect, embodiments of the invention provide polyolefin comprising ethylene, wherein the polyolefin is produced by a process comprising: contacting ethylene and optionally one or more $C_3^+$ olefins with a catalyst system described herein at a temperature, a pressure, and for a period of time sufficient to produce a polyolefin.

DETAILED DESCRIPTION OF THE INVENTION

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals. In addition two or more such hydrocarbyl radicals may together form a fused ring system, including partially or fully hydrogenated fused ring systems, which may include heterocyclic radicals.

The term "substituted" means that i) a hydrogen atom of a hydrocarbyl radical has been replaced by a hydrocarbyl containing group (e.g., methyl, ethyl, phenyl, etc.), a heteroatom, or a heteroatom-containing group; or ii) a carbon atom of a hydrocarbyl radical has been replaced with a heteroatom or a heteroatom-containing group. For purposes herein, a heteroatom is defined as any atom other than carbon and hydrogen. For example, methyl cyclopentadiene (Cp) is a Cp group wherein one hydrogen has been replaced with a methyl radical, which may also be referred to as a methyl functional group; ethyl alcohol is an ethyl group, wherein one of the H atoms has been replaced with the heteroatom-containing group —OH; and pyridine is considered a substituted phenyl group; where a carbon of the benzene ring has been replaced with a nitrogen atom.

Exemplary hydrocarbyl radicals include substituted or unsubstituted methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

For purposes herein, hydrocarbyl radicals may also include isomers of saturated, partially unsaturated and aromatic cyclic structures wherein the radical may additionally be subjected to the types of substitutions described above. The term "aryl," "aryl radical," and/or "aryl group" refers to aromatic cyclic structures, which may be substituted with hydrocarbyl radicals and/or functional groups as defined herein. An aralkyl group is defined to be a substituted aryl group. Examples of aryl and aralkyl radicals include, but are not limited to: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyl, fluoranthenyl, fluorenyl, furanyl, imidazolyl, indazolyl, indenopyrenyl, indolyl, indolinyl, isobenzofuranyl, isoindolyl, isoquinolinyl, isoxazolyl, methyl benzyl, methylphenyl, naphthyl, oxazolyl, phenanthrenyl, phenyl, pentamethylphenyl, trimethylphenyl, e.g., 2,4,6-trimethylphenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

It is to be understood that for purposes herein, when a radical is listed, it also includes all substituted radicals as defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For purposes herein, an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein, a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or in an embodiment less than 2,500 g/mol, or a low number of mer units, such as 75 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this disclosure, the term "α-olefin" includes $C_2$-$C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornene. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst," "catalyst compound," and "transition metal compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is the combination of at least one catalyst compound, at least one activator, an optional co-activator, and a support material, where the system can polymerize monomers to polymer. For the purposes of this invention and the claims thereto, when catalyst systems are described as comprising neutral stable forms of the components it is well understood by one of ordinary skill in the art that the ionic form of the component is the form that reacts with the monomers to produce polymers.

For purposes herein the term "catalyst productivity" is a measure of how many grams of polymer (P) are produced using a polymerization catalyst comprising W g of catalyst (cat), over a period of time of T hours; and may be expressed by the following formula: P/(T×W) and expressed in units of gP*gcat$^{-1}$*hr$^{-1}$. "Conversion" is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kg P/mol cat).

An "anionic ligand" is a negatively charged ligand which donates one or more pairs of electrons to a metal ion. A "neutral donor ligand" is a neutrally charged ligand which donates one or more pairs of electrons to a metal ion.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In an embodiment, a co-activator can be pre-mixed with the catalyst compound to form an alkylated catalyst compound.

As used herein, Mn is number average molecular weight, Mw is weight average molecular weight, and Mz is z average molecular weight, wt % is weight percent, and mol % is mole percent. Molecular weight distribution (MWD) is defined to be Mw divided by Mn. Unless otherwise noted, all molecular weight units, e.g., Mw, Mn, Mz, are g/mol.

For purposes herein, a bulky functional group is defined as a functional group having a molecular size greater than or equal to an isopropyl moiety. Accordingly, for purposes herein, a bulky functional group includes substituted or unsubstituted bulky aliphatic radicals having three carbons or more, bulky alicyclic radicals having three carbons or more, and/or bulky aromatic radicals having 5 carbons or more, each having a molecular size greater than or equal to an isopropyl moiety.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3V$_s$, where V$_s$ is the scaled volume. V$_s$ is the sum of the relative volumes of the constituent atoms, and is calculated from the molecular formula of the substituent using the following table of relative volumes. For fused rings, the V$_s$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, refers to tertiary butyl, n-butyl is normal butyl, pMe is para-methyl, Bz is benzyl, THF is tetrahydrofuran, Mes is mesityl, also known as 1,3,5-trimethylbenzene, Tol is toluene, TMS is trimethylsilyl, TIBAL is triisobutylaluminum, TNOAL is triisobutyl n-octylaluminum, MAO is methylalumoxane, and MOMO is methoxymethoxy (also referred to as methoxymethyl ether).

For purposes herein, RT is room temperature, which is defined as 25° C. unless otherwise specified. All percentages are weight percent (wt %) unless otherwise specified.

In the description herein, the Salan catalyst may be described as a catalyst precursor, a pre-catalyst compound, Salan catalyst compound or a transition metal compound, and these terms are used interchangeably.

The term "continuous" means a system that operates without interruption or cessation. For example, a continuous process to produce a polymer would be one where the reactants are continually introduced into one or more reactors and polymer product is continually withdrawn.

Catalyst Systems

Catalyst systems described herein comprise the reaction product of a fluorided support (such as fluorided silica) that preferably has not been calcined at a temperature of 400° C. or more, an activator and at least a first catalyst compound. Each of these will now be described in more detail.

Fluorided Support

As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Likewise, the term "support composition" means a support, desirably particulate and porous, which has been treated with at least one fluorine containing compound. Suitable fluorine containing compounds include, but are not limited to, inorganic fluorine containing compounds and/or organic fluorine containing compounds.

Supports suitable for use in this invention are generally porous materials and can include organic materials, inorganic materials, and inorganic oxides. Desirably, supports suitable for use in this invention include talc, clay, silica, alumina, magnesia, zirconia, iron oxides, boria, calcium oxide, zinc oxide, barium oxide, thoria, aluminum phosphate gel, polyvinylchloride, and substituted polystyrene, and mixtures thereof. Other useful support materials include zeolites, clays, organoclays, or any other organic or inorganic support materials and the like, or mixtures thereof.

Preferably, the support material is an inorganic oxide in a finely divided form. Suitable inorganic oxide materials for use in the catalyst systems described herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$. In a preferred embodiment of the invention the support is silica.

It is preferred that the support material, preferably an inorganic oxide, preferably silica, has a surface area in the range of from about 10 to about 800 m$^2$/g (alternately about 10 to about 700 m$^2$/g), pore volume in the range of from about 0.1 to about 4.0 cc/g and average particle size in the range of from about 5 to about 500 m. More preferably, the surface area of the support material is in the range of from about 50 to about 500 m²/g, pore volume of from about 0.5 to about 3.5 cc/g, and average particle size of from about 10 to about 200 m. Most preferably, the surface area of the support material is in the range of from about 100 to about 400 m²/g, pore volume from about 0.8 to about 3.0 cc/g, and average particle size is from about 5 to about 100 m. The average pore size of the support material useful in the invention is in the range of from about 10 to about 1000 Å, preferably 50 to about 500 Å, and most preferably 75 to about 350 Å. In some embodiments, the support material is a high surface area, amorphous silica (surface area=300 m²/gm; pore volume of 1.65 cm³/gm). Useful silicas are available under the tradenames of DAVISON™ 952, DAVISON™ 948 or DAVISON™ 955 by the Davison Chemical Division of W.R. Grace and Company. Total surface area, also referred to as "surface area" and total pore volume, also referred to as "pore volume," and average pore diameter, also referred to as "average pore size," are measured by the Brunauer-Emmett-Teller (BET) method using adsorption-desorption of nitrogen (temperature of liquid nitrogen, 77 K) with a Micromeritics Tristar II 3020 instrument after degassing of the powders for 4 hrs at 350° C. More information regarding the method can be found, for example, in "*Characterization of Porous Solids and Powders: Surface Area, Pore Size and Density*," S. Lowell et al., Springer, 2004. Average particle size, also referred to as "particle size," or "particle diameter" is determined using a Mastersizer™ 3000 (range of 1 to 3500 μm) available from Malvern Instruments, Ltd., Worcestershire, England.

In a particularly useful embodiment, the support is silica, is desirably porous and has a surface area in the range of from about 10 to about 800 m²/g, a total pore volume in the range of from about 0.1 to about 4.0 cc/g, and an average particle diameter in the range of from about 10 to about 500 m. More desirably, the surface area is in the range of from about 50 to about 500 m²/g, the pore volume is in the range of from about 0.5 to about 3.5 cc/g and the average particle diameter is in the range of from about 15 to about 150 m. Most desirably, the surface area is in the range of from about 100 to about 400 m²/g, the pore volume is in the range of from about 0.8 to about 3.0 cc/g and the average particle diameter is in the range of from about 20 to about 100 m. The average pore diameter of typical porous silicon dioxide support materials is in the range of from about 10 to about 1000 Å. Desirably, the support material has an average pore diameter of from about 50 to about 500 Å, and most desirably from about 75 to about 350 Å.

The fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. Typically, the fluorided supports described herein are prepared by combining an aqueous solution of fluorinating agent (such as $SiF_4$ or $(NH_4)_2SiF_6$) with a slurry of support (such as a toluene slurry of silica), then drying until it is free flowing, and optionally, calcining (typically at temperatures over 100° C. for at least 1 hour). The supports are then combined with activator(s) and catalyst compounds (separately or together).

A useful method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is preferably in the range of from 0.1 to 25 wt %, alternately 0.19 to 19 wt %, alternately from 0.6 to 3.5 wt %, based upon the weight of the support.

Another method of treating the support with the fluorine compound is to dissolve the fluorine compound in a solvent, such as water, and then contact the support (dry or combined with water or hydrocarbon solvent) with the fluorine compound containing solution. When water is used and silica is the support, it is desirable to use a quantity of water which is less than the total pore volume of the support.

A disadvantage of typical dry mix methods is that the density difference between fluorinating agent (such as ammonium hexafluorosilicate—density about 2.1 g/cm³) and silica (e.g., such as Davison™ 948—density about 0.7 g/cm³) makes it difficult to evenly/homogeneously distribute the fluorinating agent in the silica support. The density difference has also led to settling of ammonium hexafluorosilicate in fluorided silica derived from dry mix method. Over a period of two weeks, a vertical gradient of ammonium hexafluorosilicate concentrations in fluorided silica (made via dry mix method) stored in a bottle was observed. Such settling can lead to operational problems on a commercial scale.

To overcome these problems, an alternative method (wet-mixing) has been developed. The aqueous (wet-mixing) method employs a minimal amount of a polar solvent (e.g., water, or methanol, ethanol, isopropanol, or any solvent capable of dissolving the fluoride compound (such as ammonium hexafluorosilicate) to dissolve the fluorinating agent (e.g. ammonium hexafluorosilicate). The fluoride compound solution (such as an ammonium hexafluorosilicate solution) is then added to a slurry of silica in a non-polar solvent (e.g., toluene, or benzene, chloroform, etc.), followed by vigorous stirring of the resulting mixture. The polar/hydrophilic nature of the fluoride compound (such as ammonium hexafluorosilicate) leads to its absorption onto the hydrophilic silica surface. When the non-polar solvent is removed (by filtration), silica with an even distribution of fluorinating agent (such as ammonium hexafluorosilicate) is obtained, and ready for subsequent drying and calcination steps.

This method reduces or eliminates non-homogeneous distribution of fluorinating agent in silica associated with other methods. In addition, fluorided silica prepared via wet-mixing method gave excellent operability, whereas fluorided silica prepared via dry-mixing method often gave poor operability due to frequent plugging of catalyst feed line.

Dehydration or calcining of the silica is not necessary prior to reaction with the fluorine compound, but can be done if desired. Desirably, the reaction between the silica and fluorine compound is carried out at a temperature of from about 100° C. to about 400° C., and more desirably from about 150° C. to about 350° C. for about two to eight hours.

In one embodiment, the fluorided support composition may be generically represented by the formula: Sup-F, where "Sup" is a support, and "F" is a fluorine atom bound to the support. The fluorine atom may be bound, directly or indirectly, chemically or physically to the support. An example of chemical or physical bonding would be covalent and ionic bonding, respectively.

In another embodiment, the fluorided support composition is represented by the formula: Sup-LF$_n$, where "Sup" is a support, preferably selected from the group consisting of talc, clay, silica, alumina, magnesia, zirconia, iron oxides, boria, calcium oxide, zinc oxide, barium oxide, thoria, aluminum phosphate gel, polyvinylchloride, and substituted polystyrene; "L" is a first member selected from the group consisting of (i) bonding, sufficient to bound the F to the Sup; (ii) B, Ta, Nb, Ge, Ga, Sn, Si, P, Ti, Mo, Re, Al, or Zr bound to the Sup and to the F; and (iii) O bound to the Sup and bound to a second member selected from the group consisting of B, Ta, Nb, Ge, Ga, Sn, Si, P, Ti, Mo, Re, Al, or Zr which is bound to the F; "F" is a fluorine atom; and "n" is a number from 1-7.

An example of such bonding sufficient to bound the F to the Sup would be chemical or physical bonding, such as, for example, covalent and ionic bonding.

The fluorided support material is then typically slurried in a non-polar solvent and the resulting slurry is contacted with a solution of a catalyst compounds and activator. In some embodiments, the slurry of the fluorided support material is first contacted with the activator for a period of time in the range of from about 0.5 hours to about 24 hours, from about 1 hour to about 16 hours, or from about 2 hours to about 8 hours. The solution of the catalyst compound is then contacted with the isolated fluorided support/activator. In some embodiments, the supported catalyst system is generated in situ. In alternate embodiment, the slurry of the fluorided support material is first contacted with the catalyst compound for a period of time in the range of from about 0.5 hours to about 24 hours, from about 1 hour (or 2 hours) to about 16 hours, or from about 2 hours (or 4 hours) to about 8 hours. The slurry of the supported catalyst compound is then contacted with the activator solution.

The mixture of the catalysts, activator and fluorided support may be heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

In a preferred embodiment of the invention, the fluorided support material is slurried in a non-polar solvent and the resulting slurry is contacted with a solution of methylalumoxane (typically 30 wt % MAO in toluene). The fluorided support/MAO mixture is then heated to elevated temperature (30° C. to 120° C., preferably 80° C. to 100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring may then be applied.

In a preferred embodiment of the invention, the fluorided support material is slowly added in solid form to a solution of MAO in non-polar solvent (e.g., toluene) (typically at room temperature) with vigorous stirring. This addition sequence, namely slow and portion-wise addition of fluorided silica to MAO solution, is referred to as "reversed addition." After the addition of fluorided silica is completed, the fluorided support/MAO mixture is then heated to elevated temperature (30° C. to 120° C., preferably 80° C. to 100° C.) with vigorous stirring for a period of time (0.1 to 24 hours, preferably 1 to 3 hours). The support/activator is isolated by filtration, rinsed with non-polar solvent (e.g. toluene, pentane, hexane, etc.), and dried. The isolated support/activator is then slurried in a non-polar solvent (e.g., toluene), and a solution of catalyst compound/compounds is then contacted with the support/activator slurry. Vigorous stirring may be applied.

Under otherwise identical conditions, the "reversed addition" method for immobilizing MAO on fluorided silica surface offers higher polymerization activity for a wide variety of catalysts, compared to the "traditional addition" method where MAO solution is added to a slurry of fluorided silica in non-polar solvent.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In a preferred embodiment of the invention, the fluorided supports described herein are prepared by combining an aqueous solution of fluorinating agent (such as $(NH_4)_2SiF_6$) with a slurry of support (such as a toluene slurry of silica), drying until free flowing, optionally, calcining (typically at temperatures from 100° C. to 400° C. for at least 1 hour), then combining with activators and catalyst compounds (the activators and catalyst compounds may be added to the support separately or together).

In another embodiment of the invention, the water to solvent ratio (by weight) is between 1:10 to 1:1000, preferably between 1:20 to 1:50.

In another embodiment of the invention, the fluorided silica support can immobilize greater than 5.0 mmol "Al" per gram silica, and preferably greater than 6.0 mmol "Al"/gram silica. The amount of "Al" (from alkylalumoxane, such as MAO) that can be immobilized on 1 gram of fluorided silica is determined by an aluminum titration experiment. The titration is done at 100° C. at ambient pressure allowing the alumoxane (15 mmol Al) and the 1 gram of fluorided silica to react for 3 hours. Thereafter, the silica is washed with toluene (10 ml, 3 times) and then washed with pentane (10 ml, 3 times). The solid is then collected and dried under vacuum for 8 hours until solvent is removed. Then the sample is weighed and the difference in weight is divided by the Mw of the aluminum compound (Mw as reported in the CHEMICAL AND ENGINEERING NEWS, 63(5), pg. 27 (1985)). Methyl alumoxane is defined to be Me-Al—O. The "Al" uptake for silica-1 in the examples below was about 5.5 mmol Al/gram, whereas the "Al" uptake for silica-2 was about 6.8 mmol/gram. Higher "Al" uptake (or loading) is often desirable as it is thought to offer higher polymerization activity, provided the silica and the catalyst precursor stay unchanged. In a useful embodiment of the invention, the catalyst system comprising the fluorided silica support immobilizes greater than 5.0 mmol "Al" per gram of silica, and preferably greater than 6.0 mmol "Al" per gram of silica.

Alternately, the fluorided silica support preferably contain less than 0.05 mmol/gram fluorinating agent (such as ($NH_4)_2SiF_6$), preferably less than 0.02 mmol/gram fluorinating agent, as measured by $^1H$ NMR.

Unless otherwise indicated, $^1H$ NMR data of non-polymeric compounds is collected at room temperature in a 5 mm probe using either a Bruker or Varian NMR spectrometer operating with a $^1H$ frequency of 500 MHz. Data is recorded using a 30° flip angle RF pulse, 8 scans, with a delay of 5 seconds between pulses. Samples are prepared using approximately 5-10 mg of compound dissolved in approximately 1 mL of an appropriate deuterated solvent. Samples are referenced to residual protium of the solvents at 7.15, 7.24, 5.32, 5.98, and 2.10 for D5-benzene, chloroform, D-dichloromethane, D-1,1,2,2-tetrachloroethane, and $C_6D_5CD_2H$, respectively. Unless stated otherwise, NMR spectroscopic data of polymers is recorded in a 5 mm probe on a Varian NMR spectrometer at 120° C. using a $d_2$-1,1,2,2-tetrachloroethane solution prepared from approximately 20 mg of polymer and 1 mL of solvent using a 30° flip angle RF pulse, 120 scans, with a delay of 5 seconds between pulses.

Alternately, the surface area of the fluorided silica support is greater than 200 $m^2/g$, preferably greater than 250 $m^2/g$, as determined by BET. Alternatively, the surface area of combined fluorided silica support and activator (such as MAO) is greater than 250 $m^2/g$, preferably greater than 350 $m^2/g$, as determined by BET.

In embodiments where $SiF_4$ and/or $(NH_4)_2SiF_6$ is/are the fluoriding agent, immediately after combination of the alkylalumoxane with the fluorided support the combination preferably contains less than 0.04 mmoles per gram of silica (preferably less than 0.02 mmoles, preferably less than 0.01 mmoles) of tetraalkylsilane per gram of support as determined by $^1H$ NMR (where the alkyl is derived from the alkylalumoxane).

In useful embodiments, the ratio of mmol of fluorine per gram of silica in the fluorided support is between 0.1 and 1.5, preferably between 0.2 and 1.2, preferably between 0.4 and 1.0.

For fluorided silica prepared using $(NH_4)_2SiF_6$, the amount of residual $(NH_4)_2SiF_6$ in the silica should be equal or less than 0.04 mmol $(NH_4)_2SiF_6$/g silica, preferably equal or less than 0.02 mmol $(NH_4)_2SiF_6$/g silica, more preferably equal or less than 0.01 mmol $(NH_4)_2SiF_6$/g silica.

Catalyst Compounds

In an embodiment, the at least a first catalyst compound of the catalyst system comprises a compound represented Formula I:

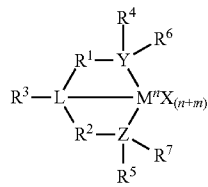

Formula I wherein:
M is a group 3-12 transition metal or a group 13 or 14 main group metal, preferably a group 4, 5, or 6 metal, preferably zirconium or hafnium;
each X is independently an anionic leaving group, preferably hydrogen, a hydrocarbyl group, a heteroatom or a halogen;
n is the formal oxidation state of M, preferably +3, +4, or +5, preferably +4;
m is the formal charge of the ligand comprising Y, Z, and L, preferably 0, −1, −2 or −3, preferably −2;
L is a group 15 or 16 element, preferably nitrogen;
Y is a group 15 element, preferably nitrogen or phosphorus;
Z is a group 15 element, preferably nitrogen or phosphorus;
$R^1$ and $R^2$ are independently a $C_1$ to $C_{20}$ hydrocarbon group, a heteroatom-containing group having up to twenty carbon atoms, silicon, germanium, tin, lead, phosphorus, a halogen, preferably a $C_2$ to $C_6$ hydrocarbon group, preferably a $C_2$ to $C_{20}$ alkyl, aryl or aralkyl group, preferably a linear, branched or cyclic $C_2$ to $C_{20}$ alkyl group, $R^1$ and $R^2$ may also be interconnected to each other;
$R^3$ is absent or a hydrocarbon group, hydrogen, a halogen, a heteroatom-containing group, preferably a linear, cyclic or branched alkyl group having 1 to 20 carbon atoms, more preferably $R^3$ is absent or hydrogen;
$R^4$ and $R^5$ are independently an aryl group, a substituted aryl group, a cyclic alkyl group, a substituted cyclic alkyl group, a cyclic aralkyl group, a substituted cyclic aralkyl group or multiple ring system, preferably having up to 20 carbon atoms, preferably between 3 and 10 carbon atoms, preferably a $C_1$ to $C_{20}$ hydrocarbon group, a $C_1$ to $C_{20}$ aryl group or a $C_1$ to $C_{20}$ aralkyl group; and
$R^6$ and $R^7$ are independently absent, or hydrogen, halogen, heteroatom or a hydrocarbyl group, preferably a linear, cyclic or branched alkyl group having 1 to 20 carbon atoms, more preferably absent.

In any embodiment, L may be bound to one of Y or Z and one of $R^1$ or $R^2$ may be bound to L and not to Y or Z. In an alternate embodiment, $R^3$ and L do not form a heterocyclic ring.

In particular embodiments, $R^4$ and $R^5$ are independently a group represented by the following formula:

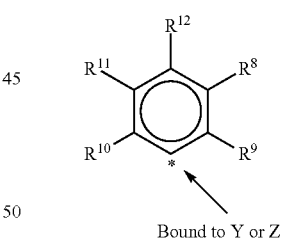

Bound to Y or Z wherein:
$R^8$ to $R^{12}$ are each independently hydrogen, a $C_1$ to $C_{40}$ alkyl group, a heteroatom, a heteroatom-containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment, $R^9$, $R^{10}$, and $R^{12}$ are independently a methyl, ethyl, propyl, or butyl group, in a preferred embodiment $R^9$, $R^{10}$, and $R^{12}$ are methyl groups, and $R^8$ and $R^{11}$ are hydrogen and the position identified by the asterisk between $R^9$ and $R^{10}$ of the phenyl ring is bonded to Y or Z.

In some embodiments, at least one of, particularly both of, $R^4$ and $R^5$ is represented by the following formula:

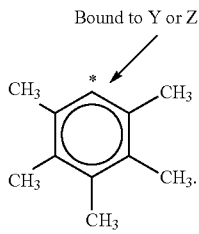

Such a group may be referred to herein as a pentamethyl phenyl group, abbreviated as $Ph(CH_3)_5$.

In such embodiments, M is preferably zirconium or hafnium, most preferably zirconium. Additionally or alternatively, in such embodiments, each of L, Y, and Z may be nitrogen; each of $R^1$ and $R^2$ may be a —$CH_2CH_2$— group; $R^3$ may be hydrogen; and $R^6$ and $R^7$ may be absent. For example, one such compound has a structure according to Formula II:

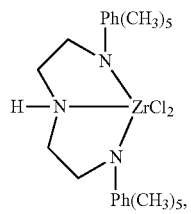

Formula II or Formula IIa where the Zr in Formula II is replaced by Hf.

In some embodiments, at least one of, particularly both of, $R^4$ and $R^5$ is a group represented by the following formula:

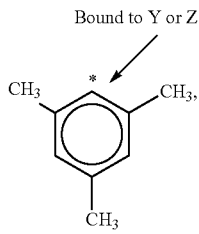

the position identified by the asterisk of the phenyl ring is bonded to Z or L.

In such embodiments, M is preferably zirconium or hafnium, most preferably zirconium. Additionally or alternatively, in such embodiments, each of L, Y, and Z may be nitrogen; each of $R^1$ and $R^2$ may be a —$CH_2CH_2$— group; $R^3$ may be hydrogen; and $R^6$ and $R^7$ may be absent. For example, one such compound has the formula:

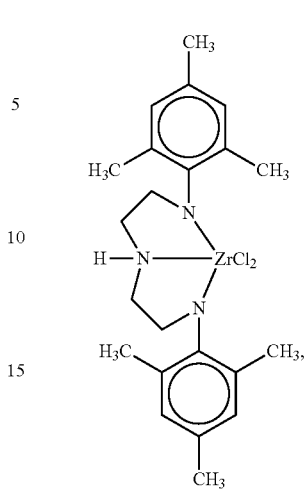

Formula III or Formula IIIa where the Zr in Formula III is replaced by Hf.

These catalyst compounds may be prepared by any known method. Particular methods are described in U.S. Pat. Nos. 5,889,128 and 6,271,325 and the references cited therein, the disclosures of which each are fully incorporated herein by reference in their entirety. One synthesis of these compounds comprises reacting the neutral ligand with $M^n X_n$, where M may be a group 3-14 metal, n is the formal oxidation state of M, X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four equivalents) of an alkylating agent, such as methyl magnesium bromide in ether. The magnesium salts are removed by filtration, and the metal complex isolated by standard techniques.

In some embodiments, particularly those where a multimodal product, e.g., a bimodal ethylene polymer, is desired, the catalyst systems described herein include a first catalyst compound according to any catalyst of Formula I, Formula II, Formula IIa, Formula III, or Formula IIIa, and a second catalyst compound. The second catalyst compound may also be any catalyst compound according to Formula I, Formula II, Formula IIa, Formula III, or Formula IIIa. In particular embodiments, the first catalyst comprises a catalyst according to Formula I and the second catalyst comprises a catalyst according to Formula II, Formula IIa, Formula IIIa, or Formula III. In particular embodiments, the catalyst system includes a first catalyst according to Formula II and a second catalyst according to Formula III.

Alternatively, the second catalyst may comprise a catalyst compound according to Formula IV:

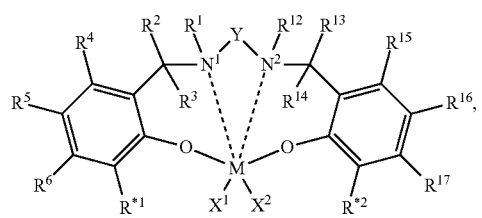

Formula IV

In Formula IV, each solid line represents a covalent bond and each dashed line represents a coordinative link; wherein:

M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided, however, when M is trivalent, $X^2$ is not present;
each $R^1$, $R^2$, $R^3$, $R^4$, $R^5$, $R^6$, $R^{12}$, $R^{13}$, $R^{14}$, $R^{15}$, $R^{16}$, and $R^{17}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;
$R^{*1}$ and $R^{*2}$ are independently, a hydrogen, a $C_1$ to $C_{40}$ hydrocarbyl radical, a functional group comprising elements from Group 13 to 17 of the periodic table of the elements, or two or more of $R^{*1}$, $R^{*2}$, and $R^1$ to $R^{17}$ may independently join together to form a $C_4$ to $C_{62}$ cyclic or polycyclic ring structure;
wherein at least one of $R^{*1}$ and $R^{*2}$ independently comprises a bulky functional group, an electron withdrawing group, or a combination thereof; and
Y is a divalent $C_1$ to $C_{20}$ hydrocarbyl radical.

In some such embodiments, the catalyst system includes a first catalyst according to Formula II, Formula IIa, Formula III or Formula IIIa and a second catalyst according to Formula IV, particularly wherein at least one of $X^1$ or $X^2$ of Formula IV is a benzyl group, particularly where both of $X^1$ and $X^2$ in Formula IV are benzyl. Additionally or alternatively, particular embodiments include those where Y, in any formula described herein, is selected from the group consisting of —$CH_2CH_2$—, 1,2-cyclohexylene, and —$CH_2CH_2CH_2$—. Additionally or alternatively, in particular embodiments, at least one of $R^{*1}$ or $R^{*2}$ is a cyclopentadienyl-containing group, a pyrrole radical, a substituted or unsubstituted phenyl group, or a diphenyl amine group. In particular embodiments, the cyclopentadienyl group is a substituted or unsubstituted cyclopentadienyl group, e.g., substituted or unsubstituted carbazole. The pyrrole radical may be selected from substituted or unsubstituted pyrrole radicals, particularly where two substituents of the pyrrole form a substituted or unsubstituted benzene ring fused to the pyrrole ring. In another embodiment, the pyrrole ring shares a first side with a first substituted or unsubstituted benzene ring and a second side with a first substituted or unsubstituted benzene ring. The diphenyl amine group may be a substituted or unsubstituted diphenyl amine radical.

Particular catalysts according to Formula IV are further described in U.S. Ser. No. 61/679,488, filed Aug. 3, 2012; Ser. No. 13/921,532, filed Jun. 19, 2013; 61/679,505, filed Aug. 3, 2012; Ser. No. 13/921,709, filed Jun. 19, 2013; 61/679,527, filed Aug. 3, 2012; Ser. No. 13/921,761, filed Jun. 19, 2013; 61/722,110, filed Nov. 2, 2012; Ser. No. 14/059,081, filed Oct. 21, 2013; 61/779,435, filed Mar. 13, 2013; 61/837,593, filed Jun. 20, 2013; Ser. No. 14/076,750, filed Nov. 11, 2013; 61/837,554, filed Jun. 20, 2013; Ser. No. 14/289,075, filed May 28, 2014; 61/837,569, filed Jun. 20, 2013; Ser. No. 14/298,575, filed Jun. 6, 2014; 61/837,588, filed Jun. 20, 2013; Ser. No. 14/289,186, filed May 28, 2014; 61/982,823, filed Apr. 22, 2014; and Ser. No. 14/557,813, filed Dec. 2, 2014, each of which is incorporated herein by reference in its entirety.

Activators

The terms "cocatalyst" and "activator" are used interchangeably to describe activators and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Activators may include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl radical. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the catalyst precursor compound comprises an abstractable ligand which is an alkyl, halide, alkoxide, or amide. Mixtures of different alumoxanes and modified alumoxanes may also be used. In an embodiment, visually clear methylalumoxane may be used. A cloudy or gelled alumoxane can be filtered to produce a clear solution or clear alumoxane can be decanted from the cloudy solution. A useful alumoxane is a modified methyl alumoxane (MMAO) described in U.S. Pat. No. 5,041,584 and/or commercially available from Akzo Chemicals, Inc. under the trade designation Modified Methylalumoxane type 3A. Solid alumoxanes may also be used.

When the activator is an alumoxane (modified or unmodified), in an embodiment, the maximum amount of activator is a 5000-fold molar excess Al/M over the catalyst compound (per metal catalytic site). In an embodiment, the minimum activator-to-catalyst-compound, which is determined according to molar concentration of the transition metal M, in an embodiment is 1 mole aluminum or less to mole of transition metal M. In an embodiment, the activator comprises alumoxane and the alumoxane is present at a ratio of 1 mole aluminum or more to mole of catalyst compound. In an embodiment, the minimum activator-to-catalyst-compound molar ratio is a 1:1 molar ratio. Other embodiments of Al:M ranges include from 1:1 to 500:1, or from 1:1 to 200:1, or from 1:1 to 100:1, or from 1:1 to 50:1.

In an embodiment, little or no alumoxane (i.e., less than 0.001 wt %) is used in the polymerization processes described herein. In an embodiment, alumoxane is present at 0.00 mol %, or the alumoxane is present at a molar ratio of aluminum to catalyst compound transition metal less than 500:1, or less than 300:1, or less than 100:1, or less than 1:1.

The term "non-coordinating anion" (NCA) refers to an anion which either does not coordinate to a cation, or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible with the polymerization or catalyst system, stabilize the transition metal cation in the sense of balancing its ionic charge at +1, and yet are sufficiently labile to permit displacement during polymerization.

In an embodiment, an ionizing or stoichiometric activator may be used, which may be neutral or ionic, such as tri (n-butyl) ammonium boron metalloid precursor, polyhalogenated heteroborane anions (WO 98/43983), boric acid (U.S. Pat. No. 5,942,459), or a combination thereof. In an embodiment, neutral or ionic activators alone or in combination with alumoxane or modified alumoxane activators may be used.

Examples of neutral stoichiometric activators include tri-substituted boron, tellurium, aluminum, gallium, and indium, or mixtures thereof. The three substituent groups or radicals can be the same or different and in an embodiment are each independently selected from substituted or unsubstituted alkyls, alkenyls, alkyns, aryls, alkoxy, and halogens. In an embodiment, the three groups are independently selected from halogen, mono or multicyclic (including halo-substituted) aryls, alkyls, and alkenyl compounds, and mixtures thereof; or independently selected from alkenyl radicals having 1 to 20 carbon atoms, alkyl radicals having 1 to 20 carbon atoms, alkoxy radicals having 1 to 20 carbon atoms and aryl or substituted aryl radicals having 3 to 20 carbon atoms. In an embodiment, the three substituent groups are alkyl radicals having 1 to 20 carbon atoms, phenyl, naphthyl, or mixtures thereof. In an embodiment, the three groups are halogenated aryl groups, e.g., fluorinated aryl groups. In an embodiment the neutral stoichiometric activator is tris-perfluorophenyl boron or tris perfluoronaphthyl boron.

In an embodiment, ionic stoichiometric activator compounds may include an active proton, or some other cation associated with, but not coordinated to, or only loosely coordinated to the remaining ion of the ionizing compound. Suitable examples include compounds and the like described in European publications EP 0 570 982 A1; EP 0 520 732 A1; EP 0 495 375 A1; EP 0 500 944 B1; EP 0 277 003 A1; EP 0 277 004 A1; U.S. Pat. Nos. 5,153,157; 5,198,401; 5,066,741; 5,206,197; 5,241,025; 5,384,299; 5,502,124; and WO 1996/04319; all of which are fully incorporated herein by reference.

In an embodiment compounds useful as an activator comprise a cation, which is, for example, a Bronsted acid capable of donating a proton, and a compatible non-coordinating anion which anion is relatively large (bulky), capable of stabilizing the active catalyst species (the Group 4 cation, e.g.) which is formed when the two compounds are combined and said anion will be sufficiently labile to be displaced by olefinic, diolefinic, or acetylenically unsaturated substrates or other neutral Lewis bases, such as ethers, amines, and the like. Two classes of useful compatible non-coordinating anions are disclosed in EP 0 277 003 A1, and EP 0 277 004 A1, which include anionic coordination complexes comprising a plurality of lipophilic radicals covalently coordinated to and shielding a central charge-bearing metal or metalloid core; and anions comprising a plurality of boron atoms such as carboranes, metallacarboranes, and boranes.

In an embodiment, the stoichiometric activators include a cation and an anion component, and may be represented by the following formula (1):

$$(Z)_d^+(A^{d-}) \tag{1}$$

wherein: Z is (L-H) or a reducible Lewis Acid, L is a neutral Lewis base; H is hydrogen; (L-H)$^+$ is a Bronsted acid; $A^{d-}$ is a non-coordinating anion having the charge d−; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the catalyst precursor, resulting in a cationic transition metal species, or the activating cation (L-H)$_d^+$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it may be represented by the formula: (Ar$_3$C$^+$), where Ar is aryl or aryl substituted with a heteroatom, or a $C_1$ to $C_{40}$ hydrocarbyl, the reducible Lewis acid may be represented by the formula: (Ph$_3$C$^+$), where Ph is phenyl or phenyl substituted with a heteroatom, and/or a $C_1$ to $C_{40}$ hydrocarbyl. In an embodiment, the reducible Lewis acid is triphenyl carbenium.

Embodiments of the anion component $A^{d-}$ include those having the formula [M$^{k+}$Q$_n$]$^{d-}$ wherein k is 1, 2, or 3; n is 1, 2, 3, 4, 5, or 6, or 3, 4, 5, or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable $A^{d-}$ components also include diboron compounds as disclosed in U.S. Pat. No. 5,447,895, which is fully incorporated herein by reference.

In an embodiment, this invention relates to a method to polymerize olefins comprising contacting olefins (e.g., ethylene) with a salan catalyst compound, a chain transfer agent (CTA) and a boron containing NCA activator represented by the formula (1) where: Z is (L-H) or a reducible Lewis acid; L is a neutral Lewis base (as further described above); H is hydrogen; (L-H) is a Bronsted acid (as further described above); $A^{d-}$ is a boron containing non-coordinating anion having the charge d (as further described above); d is 1, 2, or 3.

In an embodiment in any of the NCA's represented by Formula 1 described above, the anion component $A^{d-}$ is represented by the formula [M*$^{k*+}$Q*$_{n*}$]$^{d*-}$ wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

This invention also relates to a method to polymerize olefins comprising contacting olefins (such as ethylene) with a salan catalyst compound as described above, optionally with a CTA and an NCA activator represented by the Formula (2):

$$R_n M^{**}(ArNHal)_{4-n} \quad (2)$$

where R is a monoanionic ligand; $M^{**}$ is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is $Z_d^+$ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl radicals; $—SR^1$, $—NR^2_2$, and $—PR^3_2$, where each $R^1$, $R^2$, or $R^3$ is independently a $C_1$ to $C_{30}$ hydrocarbyl as defined above; or a $C_1$ to $C_{30}$ hydrocarbyl substituted organometalloid.

In an embodiment in any of the NCA's comprising an anion represented by Formula 2 described above, the NCA also comprises cation comprising a reducible Lewis acid represented by the formula: $(Ar_3C^+)$, where Ar is aryl or aryl substituted with a heteroatom, and/or a $C_1$ to $C_{40}$ hydrocarbyl, or the reducible Lewis acid represented by the formula: $(Ph_3C^+)$, where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, $(L-H)_d^+$, wherein L is a neutral Lewis base; H is hydrogen; (L-H) is a Bronsted acid; and d is 1, 2, or 3, or $(L-H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated herein by reference.

In an embodiment, an activator useful herein comprises a salt of a cationic oxidizing agent and a noncoordinating, compatible anion represented by the formula (3):

$$(OX^{e+})_d(A^{d-})_e \quad (3)$$

wherein: $OX^{e+}$ is a cationic oxidizing agent having a charge of e+; e is 1, 2, or 3; d is 1, 2, or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of $A^{d-}$ include tetrakis(pentafluorophenyl)borate.

In an embodiment, the salan catalyst compounds, CTA's, and/or NCA's described herein can be used with bulky activators. A "bulky activator" as used herein refers to anionic activators represented by the formula:

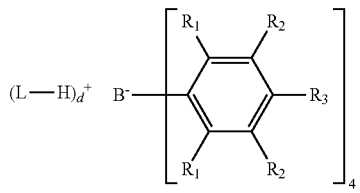

wherein:
each $R_1$ is, independently, a halide, or a fluoride;
each $R_2$ is, independently, a halide, a $C_6$ to $C_{20}$ substituted aromatic hydrocarbyl radical or a siloxy group of the formula $—O—Si—R_a$, where $R_a$ is a $C_1$ to $C_{20}$ hydrocarbyl or hydrocarbylsilyl radical (or $R_2$ is a fluoride or a perfluorinated phenyl radical);
each $R_3$ is a halide, $C_6$ to $C_{20}$ substituted aromatic hydrocarbyl radical or a siloxy group of the formula $—O—Si—R_a$, where $R_a$ is a $C_1$ to $C_{20}$ hydrocarbyl radical or hydrocarbylsilyl group (or $R_3$ is a fluoride or a $C_6$ perfluorinated aromatic hydrocarbyl radical); wherein $R_2$ and $R_3$ can form one or more saturated or unsaturated, substituted or unsubstituted rings (or $R_2$ and $R_3$ form a perfluorinated phenyl ring);
L is a neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, or greater than 300 cubic Å, or greater than 500 cubic Å.

Scavengers or Co-Activators

In an embodiment. the catalyst system may further include scavengers and/or co-activators. Suitable aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and the like. Other oxophilic species such as diethyl zinc may be used. In an embodiment, the scavengers and/or co-activators are present at less than 14 wt %, or from 0.1 to 10 wt %, or from 0.5 to 7 wt %, by weight of the catalyst system.

Methods of Preparing the Catalysts Systems

The catalysts systems described herein may be prepared by any suitable method. In an embodiment, this invention describes the preparation of fluorided supports (such as silica) through the addition of an aqueous solution of fluorine compound (such as $(NH_4)_2SiF_6$ to a slurry of support (such as a toluene slurry of silica). This preparation method contributes to an even distribution of the fluoride compound (such as $(NH_4)_2SiF_6$) onto the support surface (such as the silica surface), in contrast to a less homogeneous distribution observed when the solid salt is combined with the solid silica as described in US 2002/0123582 A1. Catalyst compounds supported on the fluorided support from this preparation exhibit comparable or higher activity compared to supported catalysts on fluorided supports made through solid/solid mixing. In an embodiment, an aqueous solution of fluorinating agent (such as $(NH_4)_2SiF_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over 100° C. for at least 1 hour).

In a particularly useful embodiment of the invention, the catalyst systems described herein are prepared by:

1. Fluorided silica preparation: The aqueous method typically employs a minimal amount of a polar solvent (e.g., water, or methanol, ethanol, isopropanol, or any solvent capable of dissolving the fluoride compound (such as ammonium hexafluorosilicate) to dissolve the fluorinating agent (such as ammonium hexafluorosilicate), but can use an excess of solvent if desired. The solution (typically ammonium hexafluorosilicate solution) is then added to a slurry of silica in a non-polar solvent (e.g., toluene, or benzene, chloroform, etc.), followed by vigorous stirring of the resulting mixture. The polar/hydrophilic nature of the fluorinating agent (such as ammonium hexafluorosilicate) leads to its absorption onto the hydrophilic silica surface. When the non-polar solvent is removed (by filtration), silica with an even distribution of fluorinating agent (such as ammonium hexafluorosilicate) is obtained, and ready for subsequent drying and calcination steps.

2a. Immobilization of alumoxane on fluorided silica: In a preferred embodiment of the invention, the fluorided support material is then slurried in a non-polar solvent and the resulting slurry is contacted with a solution of alumoxane (such as methylalumoxane). The fluorided support/alumoxane mixture is then heated to elevated temperature (30° C. to 120° C., preferably 80-100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring is typically applied.

2b. Immobilization of fluorided silica in solid form: In an alternate embodiment of the invention, the fluorided support material may be slowly added in solid form to a solution of alumoxane in non-polar solvent (e.g., toluene) (typically at room temperature) with vigorous stirring. This addition sequence, namely slow and portion-wise addition of fluorided silica to the alumoxane solution, is referred to as "reversed addition." After the addition of fluorided silica is completed, the fluorided support/alumoxane mixture is then heated to elevated temperature (30° C. to 120° C., preferably 80 to 100° C.) with vigorous stirring for a period of time (0.1 to 24 hours, preferably 1 to 3 hours). The support/activator is then isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring is typically applied. Under otherwise identical condition, the reversed addition method for immobilizing MAO on fluorided silica surface offers higher polymerization activity for a wide variety of catalysts, compared to the "traditional addition" method where methylalumoxane solution is added to a slurry of fluorided silica in non-polar solvent.

3. Activation and supportation of catalysts on silica/MAO support: The silica/MAO support/activator generated in the MAO immobilization step 2 (a or b) is slurried in a non-polar solvent (e.g. toluene). The resulting slurry is then contacted with a solution of catalysts (two catalyst precursors or more) with vigorous stirring. The mixture is stirred for 0.5 hour to 24 hours (preferably for 1 to 3 hours) at temperature between 23° C. to 110° C. (preferably at 20 to 40° C.). The finished supported catalyst is then isolated by filtration, rinsed with non-polar solvent (e.g., toluene, pentane), and dried.

4. The catalyst compounds can be dissolved together with solvent to create one solution, or each catalyst can be dissolved individually.

5. The multiple catalyst compounds can be added to silica/alumoxane support/activator slurry together in one solution, or individual solution of each catalyst precursor can be added in any order/sequence. In a preferred embodiment of the invention, the multiple catalyst compounds are added to silica/alumoxane support/activator slurry together in one solution.

Some catalyst systems are formed by spray drying. Preparation of the spray dried catalyst system can include mixing or otherwise combining the one or more catalyst compounds, one or more activators, one or more filler materials, and one or more diluents to produce a suspension. The suspension can then be spray dried to produce the spray dried catalyst system.

The components of the suspension can be combined in any suitable order or sequence. For example, the diluent or a portion of the diluent, the filler material, and the activator can be combined to produce a first mixture. The first mixture can be stirred or otherwise mixed for a period of time ranging from about 1 minute to about 24 hours. The first mixture can be mixed at a temperature ranging from room temperature up to a temperature of about 40° C., about 60° C., about 80° C., or about 100° C. After mixing the first mixture, the catalyst compound(s) can be combined with the first mixture to produce a second mixture. If only a portion of the diluent is combined in the first mixture, the catalyst compound(s) and the remaining diluent can first be combined and then added to the first mixture to produce the second mixture. The second mixture can be mixed for a period of time ranging from about 1 minute to about 24 hours. The second mixture can be mixed at a temperature ranging from room temperature to about 40° C., about 60° C., about 80° C., or about 100° C. The first mixture and/or the second mixture can be mixed under an inert atmosphere such as nitrogen.

The diluent(s) can be or include any material capable of dissolving or suspending the catalyst compound and activator and suspending the filler material. Illustrative diluents can include, but are not limited to, linear and/or branched alkanes such as ethane, propane, butane, isobutene, pentane, isopentane, hexane, heptane, octane, decene, dodecane, hexadecane, octadecane, and the like; alicyclic hydrocarbons such as cyclopentane, methylcyclopentane, cyclohexane, cyclooctane, norbornane, ethylcyclohexane, and the like; aromatic hydrocarbons such as benzene, toluene, ethylbenzene, propylbenzene, butylbenzene, xylene, and the like; petroleum fractions such as gasoline, kerosene, light oils, and the like. Likewise, halogenated hydrocarbons such as methylene chloride, dichloromethane, chlorobenzene, and the like, can also be used. Any two or more diluents can be used together to provide the diluent. The diluent can have a boiling point ranging from about 0° C. to about 150° C.

The particular amount or concentration of the various components of the catalyst system in the suspension can vary depending, at least in part, on the particular catalyst compound(s), activator(s), filler material(s), and/or diluent(s) present therein. For example, the suspension can have a concentration of the catalyst compound ranging from a low of about 0.05 wt %, about 0.09 wt %, or about 0.15 wt % to a high of about 0.4 wt %, about 0.8 wt %, or about 1.2 wt %. In another example, the suspension can have a catalyst compound concentration of from about 0.13 wt % to about 0.22 wt %, about 0.14 wt % to about 0.2 wt %, or about 0.15 wt % to about 0.19 wt %. The suspension can have a concentration of the filler material ranging from a low of about 1 wt %, about 3 wt % or about 5 wt % to a high of about 10 wt %, about 15 wt %, or about 20 wt %. In another example, the suspension can have a concentration of the filler material of from about 3 wt % to about 8 wt %, about 4 wt % to about 7 wt %, or about 5 wt % to about 6 wt %. The suspension can have a concentration of the activator ranging from a low of about 1 wt %, about 2 wt %, or about 3 wt % to a high of about 6 wt %, about 8 wt %, or about 10 wt %. The suspension can have a diluent concentration ranging from a low of about 70 wt %, about 75 wt %, or about 80 wt % to a high of about 90 wt %, about 95 wt %, or about 98 wt %.

The suspension can be atomized and introduced into a stream of heated, inert drying gas such as nitrogen, argon, propane, and the like, or any combination thereof to evaporate the diluent and produce solid-form particles of the catalyst compound and activator in a matrix of the filler material. The volumetric flow of the drying gas can be greater than the volumetric flow of the suspension. The suspension can be atomized using any suitable device(s), system(s), or combination of device(s) and/or system(s). For example, the suspension can be atomized via an atomizing nozzle or a centrifugal high speed disc atomizer.

Atomization of the suspension via an atomizing nozzle can also include mixing the suspension with an atomizing gas. The temperature of the atomizing nozzle can be at or above the boiling point of the highest boiling component of the final suspension. The atomized suspension can be introduced to a drying chamber where the volatiles can dry in the presence of the heated, inert drying gas. If any spray dried catalyst system particles having an undesirably large diameter are produced, at least a portion of those over-sized particles can be separated within a collection zone of the drying chamber. Spray dried catalyst system particles having a desired size can be recovered from the drying chamber and can then be separated from the inert drying gas. For example, the spray dried catalyst system particles and the drying gas can be separated within a cyclone. Other suitable processes for preparing the spray dried catalyst system can be similar to those discussed and described in, for example, U.S. Pat. Nos. 4,638,029; 4,728,705; 5,290,745; 5,306,350; 5,604,172; 5,716,558; 6,982,236; US 2006/0293470; and US 2007/0191215. Another nozzle is described in WO 2008/42078, fully incorporated herein by reference in its entirety.

Spray drying produces discrete catalyst system particles or particulates after evaporation of the diluent. The amount of filler present in the spray dried catalyst system can range from a low of about 5 wt %, about 10 wt %, about 15 wt %, or about 20 wt % to a high of about 50 wt %, about 60 wt %, about 70 wt %, or about 80 wt %, based on total weight of the spray dried catalyst system. For example, the spray dried catalyst system can contain from about 50 wt % to about 70 wt %, from about 52 wt % to about 65 wt %, or from about 54 wt % to about 60 wt %, based on the total weight of the filler material, the catalyst compound(s), and the activator(s).

The spray dried catalyst system can have an average particle size ranging from about 1 μm to about 500 μm. For example, the spray dried catalyst system can have an average particle size ranging from a low of about 1 μm, about 5 μm, or about 10 μm to a high of about 50 μm, about 80 μm, or about 100 μm. In another example, the spray dried catalyst system can have an average particle size of from about 5 μm to about 100 μm, from about 10 μm to about 80 μm, or from about 15 μm to about 70 μm. The spray dried catalyst system preferably has a bulk density ≥about 0.2 g/cm$^3$, e.g., ≥about 0.24 g/cm$^3$, ≥about 0.28 g/cm$^3$, etc. Additionally or alternatively, the bulk density may be ≤about 0.38 g/cm$^3$, e.g., ≤about 0.35 g/cm$^3$, ≤about 0.32 g/cm$^3$, etc. Particular ranges of the bulk density include ranges formed by any pair of the above-enumerated values, e.g., about 0.20 to about 0.38 g/cm$^3$, about 0.24 to about 0.38 g/cm$^3$, about 0.28 to about 0.38 g/cm$^3$, about 0.20 to about 0.35 g/cm$^3$, about 0.24 to about 0.35 g/cm$^3$, 0.28 to about 0.35 g/cm$^3$, about 0.20 to about 0.32 g/cm$^3$, about 0.24 to about 0.32 g/cm$^3$, about 0.28 to about 0.32 g/cm$^3$, etc.

Polymerization Processes

In an embodiment, a polymerization processes includes contacting monomers (such as ethylene and propylene), and optionally comonomers, with a catalyst system comprising an activator and at least one catalyst compound, as described above. In an embodiment, the catalyst compound and activator may be combined in any order, and may be combined prior to contacting with the monomer. In an embodiment, the catalyst compound and/or the activator are combined after contacting with the monomer.

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment of the invention, the monomer comprises propylene and an optional comonomers comprising one or more ethylene or $C_4$ to $C_{40}$ olefins, or $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In an embodiment, the monomer comprises ethylene or ethylene and a comonomer comprising one or more $C_3$ to $C_{40}$ olefins, or $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In an embodiment one or more dienes are present in the polymer produced herein at up to 10 wt %, or at 0.00001 to 1.0 wt %, or 0.002 to 0.5 wt %, or 0.003 to 0.2 wt %, based upon the total weight of the composition. In an embodiment 500 ppm or less of diene is added to the polymerization, or 400 ppm or less, or 300 ppm or less. In an embodiment, at least 50 ppm of diene is added to the polymerization, or 100 ppm or more, or 150 ppm or more.

Diolefin monomers useful in this invention include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). In an embodiment, the diolefin monomers may be selected from alpha, omega-diene monomers (i.e., di-vinyl monomers). The diolefin monomers are linear di-vinyl monomers, preferrably containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes according to the instant disclosure may be carried out in any manner known in the art. Any suspension, bulk, slurry, or gas phase polymerization process known in the art can be used. Such processes can be run in a batch, semi-batch, or continuous mode. Gas phase polymerization processes and slurry processes are suitable for use herein. Alternately the polymerization is not a homogeneous process where a homogeneous polymerization process is defined to be a process where at least 90 wt % of the product is soluble in the reaction media. Alternately, the polymerization is not a solution process where a solution polymerization process is defined to be a process where the catalyst and the product are soluble in the reaction media. In an embodiment, no solvent or diluent is present or added in the reaction medium, (except for the small amounts used as the carrier for the catalyst system or other additives, or amounts typically found with the monomer; e.g., propane in propylene). In an embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst is in granular form as solid particles (not dissolved in the diluent).

Suitable diluents/solvents for slurry polymerization processes include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene; and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In an embodiment, the solvent is not aromatic, or aromatics are present in the solvent at less than 1 wt %, or less than 0.5 wt %, or less than 0.0 wt % based upon the weight of the solvents.

In an embodiment, the feed concentration of the monomers and comonomers for the polymerization is 60 vol % solvent or less, or 40 vol % or less, or 20 vol % or less, based on the total volume of the feedstream. Or the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., or about 20° C. to about 200° C., or about 35° C. to about 150° C., or about 50° C. to about 150° C., or from about 40° C. to about 120° C., or from about 45° C. to about 80° C.; and at a pressure in the range of from about 0.35 MPa to about 10 MPa, or from about 0.45 MPa to about 6 MPa, or from about 0.5 MPa to about 4 MPa.

In an embodiment, the run time of the reaction is from about 0.1 minutes to about 24 hours, or up to 16 hours, or in the range of from about 5 to 250 minutes, or from about 10 to 120 minutes.

In an embodiment, hydrogen is present in the polymerization reactor at a partial pressure of 0.001 to 50 psig (0.007 to 345 kPa), or from 0.01 to 25 psig (0.07 to 172 kPa), or 0.1 to 10 psig (0.7 to 70 kPa).

In an embodiment, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment, the polymerization conditions include one or more of the following: 1) temperatures of 0 to 300° C. (or 25 to 150° C., or 40 to 120° C., or 45 to 80° C.); 2) a pressure of atmospheric pressure to 10 MPa (or 0.35 to 10 MPa, or from 0.45 to 6 MPa, or from 0.5 to 4 MPa); 3) the presence of an aliphatic hydrocarbon solvent (such as isobutane, butane, pentane, isopentane, hexanes, isohexane, heptane, octane, dodecane, and mixtures thereof); cyclic and alicyclic hydrocarbons, (such as cyclohexane, cycloheptane, methylcyclohexane, methylcycloheptane, and mixtures thereof); or where aromatics are present in the solvent at less than 1 wt %, or less than 0.5 wt %, or at 0 wt % based upon the weight of the solvents; and/or 4) optionally, hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

In an embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment, the polymerization occurs in one reaction zone.

Polyolefin Products

The instant disclosure also relates to processes for using the catalyst systems described herein in olefin polymerization.

Thus, the invention relates in part to processes for producing olefin polymers, e.g., polyethylene and polypropylene homopolymers and copolymers, particularly alpha-olefin copolymers. In an embodiment, the polymers produced herein are homopolymers of ethylene or propylene, are copolymers of ethylene or having from 0 to 25 mol % (or from 0.5 to 20 mol %, or from 1 to 15 mol %, or from 3 to 10 mol %) of one or more $C_3$ to $C_{20}$ olefin comonomer (or $C_3$ to $C_{12}$ alpha-olefin, or propylene, butene, hexene, octene, decene, dodecene, or propylene, butene, hexene, octene), or are copolymers of propylene or having from 0 to 25 mol % (or from 0.5 to 20 mol %, or from 1 to 15 mol %, or from 3 to 10 mol %) of one or more of $C_2$ or $C_4$ to $C_{20}$ olefin comonomer (or ethylene or $C_4$ to $C_{12}$ alpha-olefin, or ethylene, butene, hexene, octene, decene, dodecene, or ethylene, butene, hexene, octene).

In an embodiment, the monomer is ethylene and the comonomer is hexene, or from 1 to 15 mol % hexene, or 1 to 10 mol % hexene.

In an embodiment, the polymers produced herein have an Mw of 5,000 to 1,000,000 g/mol (e.g., 25,000 to 750,000 g/mol, or 50,000 to 500,000 g/mol), and/or an Mw/Mn of greater than 1 to 40, or 1.2 to 20, or 1.3 to 10, or 1.4 to 5, or 1.5 to 4, or 1.5 to 3.

In an embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In an embodiment, the polymers may be linear in character, which may be determined by elution fractionation, wherein non-linear polymers have a CDBI of less than 45%, whereas linear polyethylene types refer to polyethylene having a CDBI of greater than 50%, the CDBI being determined as described in WO 93/03093 (U.S. Pat. No. 5,206,075). In an embodiment, the polymer produced herein has a composition distribution breadth index (CDBI) of 50% or more, or 60% or more, or 70% or more. CDBI is a measure of the composition distribution of monomer within the polymer chains and is measured by the procedure described in WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

In an embodiment, polymer produced herein has less than 1400 ppm aluminum, or less than 1200 ppm, or less than 1000 ppm, or less than 500 ppm, or less than 100 ppm as determined by ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, which is used herein for purposes of determining the amount of an element in a material; and/or in an embodiment, the polymer has less than 1400 ppm of the Group 3, 4, 5, or 6 transition metal, or of the Group 4 transition metal, or of Ti, Zr, and/or Hf, or less than 1200 ppm, or less than 1000 ppm, or less than 500 ppm, or less than 100 ppm, as determined by ICPES as discussed above.

In an embodiment of the invention, an ethylene polymer according to the instant disclosure has less than 1400 ppm hafnium, or less than 1200 ppm, or less than 1000 ppm, or less than 500 ppm, or less than 100 ppm as determined by ICPES.

In an embodiment of the invention, an ethylene polymer according to the instant disclosure has less than 1400 ppm zirconium, or less than 1200 ppm, or less than 1000 ppm, or less than 500 ppm, or less than 100 ppm as determined by ICPES.

In an embodiment, the polymer produced herein, which may be an ethylene polymer, has a density of greater than 0.95 g/cc, or greater than 0.955 g/cc, or greater than 0.96 g/cc.

$^{13}$C NMR data were collected at 120° C. in a 10 mm probe using a Varian spectrometer with a $^1$Hydrogen frequency of at least 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest. Samples were dissolved in tetrachloroethane-$d_2$ at concentrations between 10 to 15 wt % prior to being inserted into the spectrometer magnet. Prior to data analysis spectra were referenced by setting the chemical shift of the $(-CH_2-)_n$ signal where n>6 to 29.9 ppm. Chain ends for quantization were identified using the signals shown in the table below. N-butyl and n-propyl were not reported due to their low abundance (less than 5%) relative to the chain ends shown in the table below.

| Chain End | $^{13}$CNMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

Differential Scanning Calorimetry (DSC)

Crystallization temperature ($T_c$), melting temperature (or melting point, $T_m$), glass transition temperature ($T_g$), and heat of fusion ($H_f$) are measured using Differential Scanning Calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Data are acquired by heating the sample to at least 30° C. above its melting temperature, typically 220° C. for polypropylene, at a heating rate of 10° C./min. The sample is held for at least 5 minutes at this temperature to destroy its thermal history. Then the sample is cooled from the melt to at least 50° C. below the crystallization temperature, typically −100° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures (Tm) reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Heat of melting (Hm) is determined using the DSC procedure above except that the sample is cooled to −100° C., held for 5 minutes then heated at 10° C./min to 200° C. Hm is measured on the first melt, not the second melt. The Hm sample must have been aged at least 48 hours at room temperature and should not be heated to destroy thermal history.

Ethylene and Propylene Content

Ethylene content in ethylene copolymers is determined by ASTM D 5017-96, except that the minimum signal-to-noise should be 10,000:1. Propylene content in propylene copolymers is determined by following the approach of Method 1 in Di Martino and Kelchermans, *J. Appl. Polym. Sci.* 56, 1781, (1995), and using peak assignments from Zhang, *Polymer*, 45, 2651, (2004) for higher olefin comonomers.

Blends

In an embodiment, the polymer (e.g., the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In an embodiment, the polymer (e.g., the polyethylene or polypropylene) is present in the above blends, at from 10 to 99 wt %, based upon the weight of the polymers in the blend, or 20 to 95 wt %, or at least 30 to 90 wt %, or at least 40 to 90 wt %, or at least 50 to 90 wt %, or at least 60 to 90 wt %, or at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

In an embodiment, the invention relates to polyolefins comprising ethylene, wherein the polyolefin is produced by a process comprising: contacting one or more olefins with a supported catalyst system as described herein at a temperature, a pressure, and for a period of time sufficient to produce a polyolefin. In some embodiments, the polyolefin comprises at least 50 mol %, e.g., at least 75 mol %, at least 99.9 mol % ethylene, of polymer units derived ethylene.

Films

In an embodiment, any of the foregoing polymers, such as the foregoing polypropylenes or blends thereof, may be used in a variety of end-use applications. Applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically, the films are oriented in the machine direction (MD) at a ratio of up to 15, or between 5 and 7, and in the transverse direction (TD) at a ratio of up to 15, or 7 to 9. However, in an embodiment, the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In an embodiment, one or more layers may be modified by corona treatment, electron beam irradiation, gamma irradiation, flame treatment, or microwave. In an embodiment, one or both of the surface layers is modified by corona treatment.

Molded Products

The compositions described herein may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the compositions described herein (or polypropylene compositions) may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring. Sheets are generally considered to have a thickness of from 254 μm to 2540 μm (10 mils to 100 mils), although any given sheet may be substantially thicker.

Non-Wovens and Fibers

The polyolefin compositions described above may also be used to prepare nonwoven fabrics and fibers of this invention in any nonwoven fabric and fiber making process, including but not limited to, melt blowing, spinbonding, film aperturing, and staple fiber carding. A continuous filament process may also be used. Or a spunbonding process is used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

EMBODIMENTS

Accordingly, the instant disclosure relates to the following embodiments:

Embodiment 1

A catalyst system comprising the reaction product of a fluorided support (such as a fluorided silica support) that preferably has not been calcined at a temperature of 400° C. or more, an activator, and at least a first catalyst compound of Formula I:

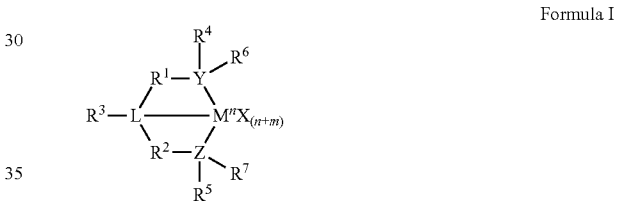

Formula I wherein:
M is a group 3 to 14 metal;
each X is independently an anionic leaving group;
n is the formal oxidation state of M;
m is the formal charge of the ligand comprising Y, Z, and L;
Y is a group 15 element;
Z is a group 15 element;
L is a group 15 or 16 element;
$R^1$ and $R^2$ are independently a $C_1$ to $C_{20}$ hydrocarbon group, a heteroatom containing group, silicon, germanium, tin, lead, or phosphorus;
$R^1$ and $R^2$ may also be interconnected to each other;
$R^3$ is absent, or is hydrogen, a group 14 atom containing group, a halogen, or a heteroatom containing group;
$R^4$ and $R^5$ are independently an aryl group, a substituted aryl group, a cyclic alkyl group, a substituted cyclic alkyl group, or a multiple ring system;
$R^6$ and $R^7$ are independently absent, hydrogen, halogen, a heteroatom, a hydrocarbyl group, or a heteroatom containing group.

Embodiment 2

The catalyst system of Embodiment 1, wherein M is a group 4, 5, or 6 transition metal.

Embodiment 3

The catalyst system of Embodiment 1 or 2, wherein M is zirconium or hafnium.

Embodiment 4

The catalyst system of any of Embodiments 1 to 3, wherein each X is independently hydrogen, halogen, or a hydrocarbyl group.

Embodiment 5

The catalyst system of any of Embodiments 1 to 4, wherein $R^1$ and $R^2$ are independently a $C_1$ to $C_6$ hydrocarbon group.

Embodiment 6

The catalyst system of any of Embodiments 1 to 4, wherein $R^1$ and $R^2$ are a $C_1$ to $C_{20}$ alkyl, aryl or aralkyl group.

Embodiment 7

The catalyst system of any of Embodiments 1 to 6, wherein m is 0, −1, −2, or −3 and n is +3, +4 or +5.

Embodiment 8

The catalyst system of any of Embodiments 1 to 7, wherein $R^3$ is absent, hydrogen, or methyl.

Embodiment 9

The catalyst system of any of Embodiments 1 to 8, wherein $R^4$ and $R^5$ are independently a hydrocarbon group having up to 20 carbon atoms.

Embodiment 10

The catalyst system of any of Embodiments 1 to 9, wherein $R^4$ and $R^5$ are independently an aryl group or an aralkyl group.

Embodiment 11

The catalyst system of any of Embodiments 1 to 10, wherein $R^4$ and $R^5$ are independently an aralkyl group.

Embodiment 12

The catalyst system of any of Embodiments 1 to 11, wherein $R^4$ and $R^5$ are independently a group represented by the following formula:

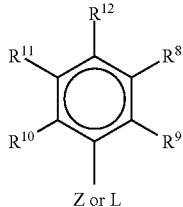

wherein:
each $R^8$ to $R^{12}$ are independently hydrogen, or a $C_1$ to $C_{20}$ alkyl group, a heteroatom, or a heteroatom containing group having up to 40 carbon atoms, and any two R groups can combine to form a cyclic group or a heterocyclic group.

Embodiment 13

The catalyst system of Embodiment 12 wherein $R^8$ is methyl, ethyl, propyl or butyl and/or $R^9$ is methyl, ethyl, propyl or butyl, and/or $R^{10}$ is methyl, ethyl, propyl or butyl, and/or $R^{11}$ is methyl, ethyl, propyl or butyl and/or $R^{12}$ is methyl, ethyl, propyl or butyl.

Embodiment 14

The catalyst system of Embodiment 12 or 13, wherein $R^9$, $R^{10}$ and $R^{12}$ are methyl and $R^8$ and $R^{11}$ are hydrogen.

Embodiment 15

The catalyst system of any of Embodiments 1 to 14, further comprising a second catalyst compound according to Formula 1.

Embodiment 16

The catalyst system of Embodiment 15, wherein the at least a first catalyst compound comprises a compound according to Formula II, IIa and the second catalyst compound a compound according to Formula III, IIIa:

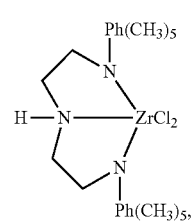

Formula II

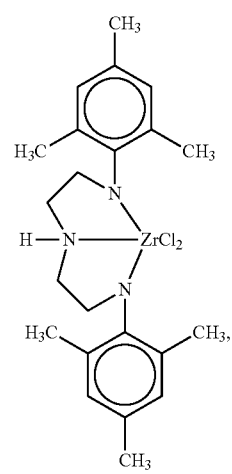

Formula III wherein:
Formula IIa is the same as Formula II expect that the Zr is replaced with Hf and Formula IIIa is the same as Formula III expect that the Zr is replaced with Hf.

Embodiment 17

The catalyst system of any of Embodiments 1 to 16, further comprising a second catalyst compound, wherein the second catalyst compound comprises a compound according to Formula IV:

Formula IV

[Chemical structure diagram of Formula IV showing a metal complex with substituents R¹-R¹⁷, R*¹, R*², X¹, X², Y, N¹, N², O, and M]

wherein:
each solid line represents a covalent bond and each dashed line represents a coordinative link; wherein M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided, however, when M is trivalent $X^2$ is not present;
each $R^1$, $R^2$, $R^3$, $R^4$, $R^5$, $R^6$, $R^{12}$, $R^{13}$, $R^{14}$, $R^{15}$, $R^{16}$, and $R^{17}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^1$, $R^{16}$, and $R^{17}$ independently join together to form a $C_4$ to $C_{62}$ cyclic or polycyclic ring structure, or a combination thereof;
$R^{*1}$ and $R^{*2}$ are independently, a hydrogen, a $C_1$-$C_{40}$ hydrocarbyl radical, a functional group comprising elements from Group 13 to 17 of the periodic table of the elements, or two or more of $R^{*1}$, $R^{*2}$, and $R^1$ to $R^{17}$ may independently join together to form a $C_4$ to $C_{62}$ cyclic or polycyclic ring structure;
wherein at least one of $R^{*1}$ and $R^{*2}$ independently comprises a bulky functional group, an electron withdrawing group, or a combination thereof; and
Y is a divalent $C_1$ to $C_{20}$ hydrocarbyl radical.

Embodiment 18

The catalyst system of any of Embodiments 1 to 17, wherein the activator comprises alkyl aluminum compounds, alumoxanes, modified alumoxanes, non-coordinating anions, boranes, borates, and/or ionizing compounds.

Embodiment 19

The catalyst system of any of Embodiments 1 to 18, wherein the catalyst composition is spray dried.

Embodiment 20

The catalyst system of any of Embodiments 1 to 19, wherein the at least a first catalyst compound and/or the activator are placed on the fluoride silica support before being placed in the gas or slurry phase.

Embodiment 21

The catalyst system of any of Embodiments 1 to 20, further comprising a metal stearate.

Embodiment 22

The catalyst system of Embodiment 21, wherein the metal stearate comprises an aluminum stearate and/or zinc stearate.

Embodiment 23

The catalyst system of Embodiment 22, wherein the aluminum stearate is aluminum distearate.

Embodiment 24

A polymerization process comprising contacting one or more olefins with a catalyst system of any of Embodiments 1 to 23 at a temperature, a pressure, and for a period of time sufficient to produce a polyolefin.

Embodiment 25

The polymerization process of Embodiment 24, wherein the olefin comprises ethylene.

Embodiment 26

The polymerization process of Embodiment 24, wherein the olefin comprises propylene.

Embodiment 27

The polymerization process of Embodiment 24, wherein the olefin comprises ethylene and a $C_3$ to $C_{20}$ alpha olefin.

Embodiment 28

The polymerization process of Embodiment 24, wherein the olefin comprises ethylene and hexene and/or butene.

Embodiment 29

The polymerization process of any of Embodiments 24 to 28, wherein the polymer produced has a molecular weight of 250 g/mol to 1,000,000 g/mol.

Embodiment 30

The polymerization process of any of Embodiments 24 to 29, wherein the polymerization occurs in a gas phase at a reactor temperature of 30° C. to 120° C.

Embodiment 31

The polymerization process of any of Embodiments 24 to 30, wherein the polymerization occurs in the gas phase at a reactor temperature of 60° C. to 115° C.

Embodiment 32

The polymerization process of any of Embodiments 24 to 31, wherein the temperature is 70° C. to 110° C.

Embodiment 33

The polymerization process of any of Embodiments 24 to 32, wherein the polymerization occurs in the slurry phase as particle form polymerization at a temperature of 85° C. to 110° C.

Embodiment 34

The polymerization process of any of Embodiments 24 to 31, wherein the polymerization occurs in the slurry phase in a loop reactor at a temperature of 60° C. to 104° C.

Embodiment 35

A polyolefin comprising ethylene, wherein the polyolefin is produced by a process comprising:
contacting one or more olefins with a catalyst system of any of Embodiments 1 to 23 at a temperature, a pressure, and for a period of time sufficient to produce a polyolefin.

Embodiment 36

The polyolefin of Embodiment 35, comprising at least 50 mol % of polymer units derived from ethylene.

Embodiment 37

The polyolefin of Embodiment 35 or 36, comprising at least 75 mol % of polymer units derived from ethylene.

Embodiment 38

The polyolefin of any of Embodiments 35 to 37, comprising at least 99.9 mol % of polymer units derived from ethylene.

Embodiment 39

The polyolefin of Embodiment 35 to 38, having an Mn of 250 g/mol to 1,000,000 g/mol.

Embodiment 40

The polyolefin of any of Embodiments 35 to 39, further comprising 0.1 to <50 mol % polymer units derived from 1-hexene.

Embodiment 41

A process to produce a film comprising extruding, blowing, or casting a film from a polymer produced by a polymerization process comprising contacting one or more olefins with a catalyst system of any of Embodiments 1 to 23 at a temperature, a pressure, and for a period of time sufficient to produce a polyolefin.

Embodiment 42

The process to produce a film of Embodiment 41, wherein the film is a blown film.

Embodiment 43

A method of preparing a catalyst system, comprising combining a fluoride compound with water, then combining with a slurry of non-polar solvent and silica support, removing the non-polar solvent, thereafter combining the support with a second solvent, which may be the same as or different from the non-polar solvent, and at least a first catalyst system according to any of Embodiments 1 to 23 and activator, wherein the fluorided support is calcined at a temperature from 100 to less than 400° C., before or after combination with the activator and/or catalyst compounds.

Embodiment 44

The method of Embodiment 43, wherein the ratio (by weight) of water to non-polar solvent is between 1:10 to 1:1000.

Embodiment 45

The method of any of Embodiments 43 to 44, wherein the non-polar solvent is toluene, pentane, hexane, benzene, or chloroform.

Embodiment 46

The method of any of Embodiments 43 to 45, wherein the fluoride compound is one or more of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$.

Embodiment 47

The method of Embodiments 43 to 45, wherein the fluoride compound comprises ammonium hexafluorosilicate, ammonium tetrafluoroborate, or a mixture thereof.

Embodiment 48

The method of any of Embodiments 43 to 47, further comprising spray-drying the catalyst system.

EXPERIMENTAL

Examples

Melt index (MI) also referred to as $I_2$, reported in g/10 min, is determined according to ASTM D1238, 190° C., 2.16 kg load.

High load melt index (HLMI) also referred to as $I_{21}$, reported in g/10 min, is determined according to ASTM D1238, 190° C., 21.6 kg load.

Melt index ratio (MIR) is MI divided by HLMI as determined by ASTM D1238.

Density is determined according to ASTM D1505.

Bulk Density is measured according to ASTM D1895.

The resultant polymer is analyzed by Rapid GPC (see below) to determine the molecular weight, by FT-IR (see below) to determine percent of 1-hexene incorporation. To determine various molecular weight related values by GPC, high temperature size exclusion chromatography is performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm*7.5 mm linear columns, each containing PLgel 10 μm, Mix B. The GPC system is calibrated using polystyrene standards ranging from 580-3,390,000 g/mol. The system is operated at an eluent flow rate of 2.0 mL/minutes and an oven temperature of 165° C. 1,2,4-trichlorobenzene was used as the eluent. The polymer samples are dissolved in 1,2,4-trichlorobenzene at a concentration of 0.1-0.9 mg/mL. 250 uL of a polymer solution is injected into the system. The concentration of the polymer in the eluent is monitored using an evaporative light scattering detector. The molecular weights presented are relative to linear polystyrene standards and are uncorrected.

The foregoing discussion can be further described with reference to the following non-limiting examples. All reactions were carried out under a purified nitrogen atmosphere using standard glovebox, high vacuum or Schlenk techniques, unless otherwise noted. All solvents used were anhydrous, de-oxygenated and purified according to known procedures. All starting materials were either purchased from Aldrich and purified prior to use or prepared according to procedures known to those skilled in the art.

Catalyst 1: $[(2,4,6-Me_3C_6H_2)\ NCH_2CH_2]_2NH\}Zr(CH_2Ph)_2$ and Catalyst 2: $[(2,4,6-Me_5C_6)NCH_2CH_2]_2NH\}Zr(CH_2Ph)_2$ were made using preparations similar to those in U.S. Pat. Nos. 7,754,840, 6,271,325, 8,501,659, each of which is incorporated herein by reference in its entirety. Structures of Catalyst 1 and Catalyst 2 are shown in Illustration I.

Illustration I

Catalyst 1

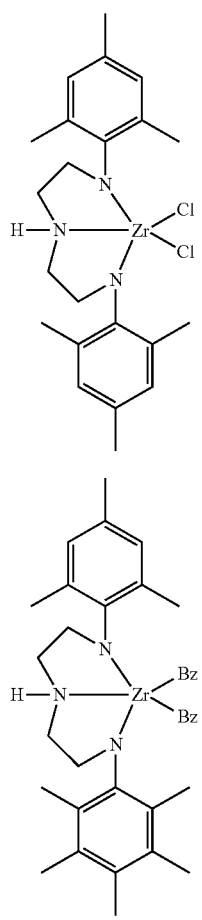

Catalyst 2

Preparation of Support

Silica Support (sMAO):
Silica (Grace Davison D948, 40.7 g) is calcined at 600° C. then slurried in 200 mL of toluene. MAO (71.4 g of a 30 wt % toluene solution, 351.1 mmol of Al) is added slowly to the slurry. The slurry is then heated to 80° C. and stirred for 1 hr. The slurry is filtered, washed three times with 70 mL of toluene and once with pentane. The solid is dried under vacuum overnight to give a 60.7 g amount of free flowing white solid.

Fluorided Silica Support (F-sMAO):
1.18 g $(NH_4)_2SiF_6$ is dissolved in 7.00 g water in a 20 ml glass vial. 50 g silica (Grace Davison D948) and 200 g of toluene are combined in a 250 ml Celstir™. Under vigorous stirring, the aqueous solution of $(NH_4)_2SiF_6$ is added via a syringe to the toluene slurry. The mixture is allowed to stir at room temperature for 2.5 h. The milky slurry is filtered through a 500 ml Optichem disposable polyethylene frit (40 micron), rinsed with 200 g pentane for three times, then dried in air overnight to yield a white, free-flowing solid. The solid is transferred into a tube furnace, and is heated to 200° C. under constant nitrogen flow (temperature program: 25° C./h ramped to 150° C.; held at 150° C. for 4 hours; 50° C./h ramped to 200° C.; held at 200° C. for 4 hours; cooled down to room temperature). 46 g of fluorided silica is collected after the calcination. Calculated F-loading: 0.8 mmol/g (F-loading=mmol of F/gram of added raw silica).

MAO (37.6 g of 30% wt in toluene) is added to a 250 ml celstir along with 100 mL of toluene. 29.9 g fluorided silica prepared in the previous step is added to the slurry in 5 g increments. The reaction stirred for 10 minutes at room temperature and is then heated to 100° C. for 3 hours. The solid is filtered, washed twice with 80 mL of toluene, washed twice with pentane, and dried under vacuum overnight. 39.6 g of free flowing white solid is collected.

Preparation of Supported Catalyst

Procedure I (Preparation of Supported Catalyst)

Example 1: Silica Supported Catalyst 1

In a 20 ml glass vial sMAO (0.495 g) and toluene (3.0 g) are combined. A toluene solution (1.0 gram) containing Catalyst 1 (9.4 mg, 18.8 μmol) is added to the glass vial via a pipette. The glass vial is capped with a Teflon-lined cap and vortexed at room temperature for 90 min. The resulting slurry is filtered through a 18 mL polyethylene frit (10 micron) and rinsed with toluene (2×, 3 g), followed by rinsing three times with pentane (3×, 1.4 g). The collected solid is dried under vacuum for 40 minutes. Supported Catalyst 1 (0.478 g) is recovered. Calculated catalyst loading: 38 μmol/g (catalyst loading=μmol of catalyst/gram of added sMAO).

Example 2: Fluorided-Silica Supported Catalyst 1

In a 20 ml glass vial 0.493 g F-sMAO and 3.0 g toluene are combined. 1.0 gram toluene solution containing 9.4 mg Catalyst 1 (18.8 μmol) is added to the glass vial via a pipette. The remaining steps of the preparation are substantially the same as described for Example 1. Catalyst 1 (0.448 g) supported on fluorided silica is collected. Calculated catalyst loading: 38 μmol/g.

Example 3: Silica Supported Catalyst 2

In a 20 ml glass vial sMAO (0.50 g) and toluene (3.0 g) are combined. A toluene solution (1.0 gram) containing Catalyst 2 (11.3 mg, 17.0 μmol) is added to the glass vial via a pipette. The remaining steps of the preparation are substantially the same as described for Example 1. Calculated catalyst loading: 34 μmol/g.

Example 4: Fluorided-Silica Supported Catalyst 2

In a 20 ml glass vial F-sMAO (0.986 g) and toluene (3.0 g) are combined. A toluene solution (1.0 g) containing Catalyst 2 (23.0 mg, 34.5 μmol) is added to the glass vial via a pipette. The remaining steps of the preparation are substantially the same as described for Example 1. Catalyst 2 supported on fluorided silica (0.984 g) is collected. Calculated catalyst loading: 35 μmol/g.

Example 5: Silica Supported Catalyst 3

In a 20 ml glass vial F-sMAO (0.500 g) and toluene (3.0 g) are combined. A toluene solution (1.0 g) containing a comparative metallocene catalyst (1,3-MeBuCp)$_2$ZrCl$_2$, Catalyst 3, (8.1 mg, 20.0 μmol) is added to the glass vial via a pipette. The remaining steps of the preparation are substantially the same as described for Example 1. The calculated catalyst loading is 40 μmol/g.

Example 6: Supported Dual-Catalyst System Comprising Catalyst 2 and Catalyst 3

In a 20 ml glass vial, F-sMAO prepared as described above (0.5000 g) and toluene (3.0 g) are combined. A toluene solution (1.0 g) containing Catalyst 3 (4.1 mg, 10.3 μmol) and Catalyst 2 (6.8 mg, 8.2 μmol) is added to the glass vial via a pipette. The remaining steps of the preparation are substantially the same as described for Example 1. Calculated total catalyst loading: 37 μmol/g. The calculated mole ratio of Catalyst 2 to Catalyst 3 is 0.8:1.

Example A: Supported Catalyst System Comprising Catalyst 2

In a 20 ml glass vial, F-sMAO prepared as described above (1.0747 g) is slurried in toluene (15 mL). Catalyst 2 (23.8 mg, 0.0428 μmol) is dissolved in toluene (5 mL) and added to the slurry. The vial containing Catalyst 2 is rinsed with additional toluene (2 mL) which is added to the slurry. The slurry is stirred for 1 hr, filtered, washed with toluene (3×15 mL) followed by washing twice with pentane. The solid is dried under vacuum to give a whitish solid (1.04 g).

Examples 7-12: Ethylene/1-Hexene Copolymerization

Preparation of catalyst slurry for high throughput run: In a dry box, 45 mg of supported catalyst is weighed into a 20 ml glass vial. 15 ml of toluene is added to the vial to make a slurry that contained 3 mg supported catalyst/ml slurry. The resulting mixture is vortexed prior to injection.

Starting material preparations: Solvents, polymerization grade toluene and isohexane are supplied by ExxonMobil Chemical Company and thoroughly dried and degassed prior to use. Polymerization grade ethylene is used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. TnOAl (tri-n-octylaluminum, neat) is used as a 2 mmol/L solution in toluene.

Reactor Description and Preparation

Polymerizations are conducted in an inert atmosphere (N$_2$) drybox using autoclaves equipped with an external heater for temperature control, glass inserts (internal volume of reactor=22.5 mL), septum inlets, regulated supply of nitrogen, ethylene and hexene, and equipped with disposable PEEK mechanical stirrers (800 RPM). The autoclaves are prepared by purging with dry nitrogen prior to use.

The reactor is prepared as described above, and then purged with ethylene. Isohexane, 1-hexene (30 μl, 6 mol % in feed) 1-hexene and TnOAl are added via syringe at room temperature and atmospheric pressure. The reactor is then brought to process temperature (85° C.) and charged with ethylene to process pressure (130 psig=896 kPa) while stirring at 800 RPM. The selected supported catalyst system (100 μL of a 3 mg/mL toluene slurry, unless indicated otherwise) is added via syringe with the reactor at process conditions. TnOAl is used as 200 μL of a 20 mmol/L in isohexane solution. Amounts of reagents not specified above are given in Table 1. No other reagent is used. Ethylene is allowed to enter (through the use of computer controlled solenoid valves) the autoclaves during polymerization to maintain reactor gauge pressure (+/−2 psig). Reactor temperature is monitored and typically maintained within +/−1° C. Polymerizations are halted by addition of approximately 50 psi O$_2$/Ar (5 mole % O$_2$) gas mixture to the autoclaves for approximately 30 seconds. The polymerizations are quenched after a predetermined cumulative amount of ethylene had been added or for a maximum of 45 minutes polymerization time. In addition to the quench time for each run, the reactors are cooled and vented. The polymer is isolated after the solvent is removed in-vacuo. Yields reported include total weight of polymer and residual catalyst. Catalyst activity is reported as kilograms of polymer per mmol transition metal compound per hour of reaction time (kg/mmol·hr).

TABLE 1

| Example | Catalyst System | Support | Added H$_2$ (ppm) | Activity (kg/mol*h) | Mw/1000 (g/mol) | Mw/Mn | wt % C6 |
|---|---|---|---|---|---|---|---|
| Ex. 7 | Ex. 1 | sMAO | 0 | 5616 | 2048 | 3.5 | 3.0 |
|  |  |  | 300 | 4367 | 1363 | 3.1 | 2.5 |
| Ex. 8 | Ex. 2 | F-sMAO | 0 | 12281 | 2158 | 4.2 | 2.9 |
|  |  |  | 300 | 11139 | 1461 | 2.9 | 2.3 |
| Ex. 9 | Ex. 3 | sMAO | 0 | 12070 | 2430 | 3.4 | 3.3 |
|  |  |  | 300 | 16033 | 1376 | 3.5 | 3.1 |
| Ex. 10 | Ex. 4 | F-sMAO | 0 | 40809 | 1905 | 4.5 | 3.3 |
|  |  |  | 300 | 36512 | 1154 | 3.1 | 3.4 |
| Ex. 11 | Ex. 5 | sMAO | 0 | 18193 | 461 | 2.0 | 2.4 |
|  |  |  | 300 | 21706 | 260 | 1.8 | 2.6 |
| Ex. 12 | Ex. 6 | F-sMAO | 0 | 33928 | 1191 | 3.8 | 3.3 |
|  |  |  | 300 | 44582 | 787 | 4.7 | 2.8 |

Table 1 shows that supported catalysts prepared with fluorided silica (e.g., Examples 7 and 9) exhibit much higher activity than the ones prepared with un-treated silica (e.g., Examples 6 and 8), under otherwise identical polymerization conditions. Supported Zr complexes of bis(phenylamidoethyl)amine ligands afford high molecular weight (>1000 k) PE with moderate to good 1-hexene incorporation (2.3-3.3 wt %) and slightly broader MWD (e.g., 2.9-4.2) than the polyethylenes produced with conventional supported metallocene catalyst system (e.g., Example 10). The supported dual-catalyst system of Example 12 exhibits high activity in slurry ethylene/1-hexene copolymerization and provides a resin having a high molecular weight.

Example 13: Supported Dual Catalyst System with Catalyst 2 and Catalyst 4

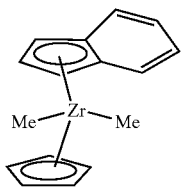

Catalyst 4

In a 20 ml glass vial, F-sMAO prepared as described above (34.90 g) is slurried in toluene (170 mL). MAO (64.7259 g, 30 wt % in toluene) is added slowly to the F-sMAO/toluene slurry and washed with toluene (10 mL). The slurry is heated to 100° C. and stirred for 1 hr. The slurry is filtered and washed with toluene (3×50 mL) and twice with pentane. The solid is dried under vacuum for 3 hrs and then reslurried in toluene (170 mL). Catalyst 4, CpIndZrCl$_2$, (364.9 mg, 1.066 mmol) and Catalyst 2 (592.5 mg, 1.066 mmol) are slurried together in toluene (20 mL) and added to the F-sMAO slurry. The catalyst vial is rinsed with another 30 mL of toluene which is added to the slurry. The catalyst system is stirred for 1 hr 20 min, filtered, washed three times with 50 mL of toluene, washed twice with pentane, and dried under vacuum overnight. A yellow solid (45.4 g) is collected.

Example 14: Supported Dual Catalyst System with Catalyst 2 and Catalyst 4

F-sMAO (50.662 g) is slurried in toluene (150 mL). Catalyst 2 (560.8 mg, 1.009 mmol) and Catalyst 4 (346.9 mg, 1.013 mmol) are dissolved in toluene (20 mL) and added to the slurry. The vial containing Catalyst 2 and Catalyst 4 is washed with toluene (30 mL) and added to the slurry. The slurry is stirred for 1 hr. The slurry is then filtered, washed with 50 mL of toluene three times and washed with pentane twice. The resulting solid is dried under vacuum to give a yellowish/whitish solid (50.6 g).

Example 15: High Fluoride Content Silica Supported Catalyst System

F-sMAO (50.5 g, double F-load) is slurried in toluene (180 mL). X-1 (352.0 mg, 1.007 mmol) and Catalyst 2 (559.2 mg, 1.006 mmol) are slurried together in toluene (10 mL) and added to the slurry. The catalyst vial is washed with another 10 mL of toluene and added to the slurry. The slurry stirred for 1 hr at RT. The slurry is then filtered, washed three times with 50 mL of toluene and twice with pentane. The solid was dried overnight to give 49.7 grams of yellowish solid.

Example 16: Slurry Polymerizations with Catalyst System of Example 5

A 2 L autoclave reactor is heated to 100° C. under a constant nitrogen purge for at least 1 hr. The reactor is then cooled down to room temperature. A catalyst tube containing 2 mL of a 0.091M solution of TNOAL in hexanes is added to the reactor with nitrogen. 300 mL of isohexane is added through the catalyst tube. Another catalyst tube containing 30 mL of 1-hexene is connected to the reactor. The 1-hexene is pushed in with another 300 mL of isohexane. The reactor is heated to 85° C. and stirring is set to 500 rpm. A third catalyst tube loaded with the catalyst system of Example 5 (54.1 mg) and 2 mL of pentane is attached to the reactor. The reactor is pressurized with 20 psi of ethylene. The catalyst system is then pushed into the reactor with 200 mL of isohexane. Ethylene is introduced into the reactor to give a total ethylene pressure of 130 psi. The reaction is terminated after 10 mins. 235 grams of polyethylene is obtained. Activity: 26063 g polymer/(g cat*hr), 668278 g polymer/(mmol Zr*hr). 1-hexene wt % via NMR: 4.86%, Mw: 677761, Mn: 147735, Mw/Mn: 4.59.

Example 17: Slurry Polymerizations with Catalyst System of Example 5

A 2 L autoclave reactor is heated to 100° C. under a constant nitrogen purge for at least 1 hr. The reactor is then cooled down to room temperature. A catalyst tube containing 2 mL of a 0.091M solution of TNOAL in hexanes is added to the reactor with nitrogen. 300 mL of isohexane is added through the catalyst tube. Another catalyst tube containing 10 mL of 1-hexene is connected to the reactor. The 1-hexene is pushed in with another 300 mL of isohexane. The reactor is heated to 85° C. and stirring is set to 500 rpm. A third catalyst tube loaded with catalyst system of Example 5 (45.2 mg) and 2 mL of pentane is attached to the reactor. The reactor is pressurized with 20 psi of ethylene. The catalyst is then pushed into the reactor with 200 mL of isohexane. Ethylene is introduced into the reactor to give a total ethylene pressure of 130 psi. The reaction is allowed to proceed for 20 min. 15.2 grams of polyethylene is obtained. Activity: 1005 g polymer/(g cat*hr), 51,555 g polymer/(mmol Zr*hr). 1-hexene wt % via 1H NMR: 2.16%.

Example 18: Slurry Polymerizations with Catalyst System of Example 13

A 2 L autoclave reactor is heated to 100° C. under a constant nitrogen purge for at least 1 hr. The reactor is then cooled down to room temperature. A catalyst tube containing 2 mL of a 0.091M solution of TNOAL in hexanes is added to the reactor with nitrogen. 300 mL of isohexane is added through the catalyst tube. Another catalyst tube containing 10 mL of 1-hexene is connected to the reactor. The 1-hexene is pushed in with another 300 mL of isohexane. The reactor is heated to 85° C. and stirring is set to 500 rpm. A third catalyst tube loaded with the catalyst system of Example 13 (45.0 mg) and 2 mL of pentane is attached to the reactor. The reactor is pressurized with 20 psi of ethylene. The catalyst is then pushed into the reactor with 200 mL of isohexane. Ethylene is placed on top of the reactor to give a total ethylene pressure of 130 psi. The reaction is allowed to proceed for 20 min. 17.9 grams of polyethylene is obtained. Activity: 1193.4 g polymer/(g cat*hr), 30837 g polymer/(mmol Zr*hr). 1-hexene wt % via NMR: 2.58%, melt index ($I_{2.16}$)<0.01 g/min.

Example 19: Polymerization with Catalyst System Comprising Catalyst 2 and Catalyst 4

Polymerization is performed in a 7 foot tall gas-phase fluidized bed reactor with a 6" body and a 10" expanded section. Cycle and feed gases are fed into the reactor body through a perforated distributor plate, and the reactor is controlled at 300 psi and 70 mol % ethylene. Reactor temperature is maintained by heating the cycle gas. Supported catalyst prepared according to Example 14 with a Catalyst 2: Catalyst 4 ratio of 1:1 is fed as a 10 wt % slurry in Sono Jell® from Sonneborn (Parsippany, N.J.). The slurry is delivered to the reactor by nitrogen and isopentane feeds. Polymer is collected from the reactor as necessary to maintain the desired bed weight. Average process conditions from at least 3 Bed-Turnovers (BTOs) are reported in Table 2.

Significant activity is obtained through the use of fluorinated supports and may be tailored by adjusting the amount of fluorinating agent. The 1:1 ratio catalyst pair with less fluorinating agent (F0.8) showed slightly higher activity than a catalyst system with Catalyst 3 but lacking Catalyst 2, indicating contribution by Catalyst 2. The activity of this catalyst pair is also comparable to a conventional metallocene catalyst system, such as the catalyst system of Example 3, as both catalysts showed activities roughly 1600 gpoly/gcatalyst. As Example 19 shows, the activity of the catalyst system may be increased to 3600 gpoly/gcatalyst by doubling the amount of fluorinating agent (F1.6).

Process conditions and product properties also indicate activity of Catalyst 2 in the dual catalyst system. At identical reactor temperature, pressure and ethylene composition, the catalyst system of Example 19 produced a polyethylene having a melt index ($I_{2.16}$) of 0.48 g/10 min with 768 ppm hydrogen in the reactor while catalyst system comprising only Catalyst 4 produces a polyethylene having a melt index ($I_{2.16}$) of 0.92 g/10 min. with only 187 ppm hydrogen in the reactor. The lower melt index at a significantly higher hydrogen composition shows the contribution from Catalyst 2. These contributions are even more exaggerated in the catalyst system of Example 15, as 1880 ppm of hydrogen results in a polyethylene having a melt index (I2.16) of 0.27 g/10 min showing that the activity of catalyst systems comprising compounds such as Catalyst 2 may be adjusted by varying the amount of fluorinating agent used in making the silica support.

TABLE 2

Average process conditions and polymer properties for fluoride silica supported catalyst systems comprising Catalyst 2 and/or Catalyst 4.

| | Catalyst(s) (Ratio) (F-loading) | | | |
| --- | --- | --- | --- | --- |
| | Cat. 2:Cat. 4 (1:1) (F0.8) | Cat. 2:Cat. 4 (1:1) (F1.6) | Cat 4. (½ Load) | Cat. 3 |
| Temperature (° C.) | 85 | 85 | 85 | 85 |
| Pressure (psi) | 300 | 300 | 300 | 300 |
| Ethylene (mol %) | 69.8 | 70.0 | 70.0 | 70.0 |
| Hydrogen (ppm) | 768 | 1881 | 187 | 175 |
| Hexene (mol %) | 1.47 | 1.55 | 1.76 | 1.58 |
| Bed Weight (g) | 1469 | 1518 | 2000 | 2000 |
| Residence Time (hr) | 3.4 | 2.6 | 6.4 | 5.4 |

TABLE 2-continued

Average process conditions and polymer properties for fluoride silica supported catalyst systems comprising Catalyst 2 and/or Catalyst 4.

| | Catalyst(s) (Ratio) (F-loading) | | | |
| --- | --- | --- | --- | --- |
| | Cat. 2:Cat. 4 (1:1) (F0.8) | Cat. 2:Cat. 4 (1:1) (F1.6) | Cat 4. (½ Load) | Cat. 3 |
| Cycle Gas Velocity (ft/s) | 1.53 | 1.61 | 1.62 | 1.62 |
| Production Rate (g/hr) | 428 | 586 | 313 | 372 |
| Activity ($g_{poly}/g_{supported\ cat}$) | 1616 | 3686 | 1324 | 1584 |
| Catalyst Slurry Feed (cc/hr) | 3.0 | 1.8 | 2.7 | 2.7 |
| MI I2.16 (g/10 min) | 0.48 | 0.27 | 0.92 | 1.00 |
| HLMI I21.6 (g/10 min) | 28.98 | 23.58 | 22.59 | 20.50 |
| MIR (I21.6/I2.16) | 60.20 | 87.59 | 24.58 | 20.50 |
| Density (g/cm³) | 0.9211 | 0.9213 | 0.9217 | 0.9186 |
| Bulk Density (g/cc) | 0.3105 | 0.3286 | 0.3318 | 0.3419 |
| $N_2$ Cat. Probe Feed (cc/min) | 6000 | 6000 | 6000 | 6000 |
| $iC_5$ Cat. Probe Feed (g/min) | 1 | 1 | 1 | 1 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

What is claimed is:

1. A catalyst system comprising the reaction product of: 1) a fluorided support consisting essentially of fluorided silica, 2) an activator and 3) at least a first catalyst compound of Formula I:

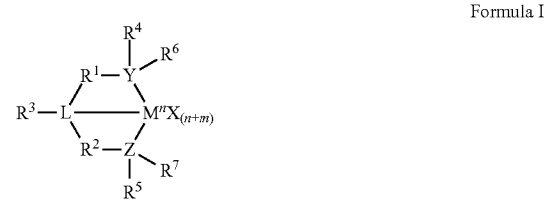

Formula I wherein:
M is a group 3 to 14 metal;
each X is independently an anionic leaving group;
n is the formal oxidation state of M;
m is the formal charge of the ligand comprising Y, Z, and L;
Y is a group 15 element;
Z is a group 15 element;

L is a group 15 or 16 element;
R$^1$ and R$^2$ are independently a C$_1$ to C$_{20}$ hydrocarbon group, a heteroatom containing group, silicon, germanium, tin, lead, or phosphorus;
R$^1$ and R$^2$ may also be interconnected to each other;
R$^3$ is absent, or is hydrogen, a group 14 atom containing group, a halogen, or a heteroatom containing group;
R$^4$ and R$^5$ are independently an aryl group, a substituted aryl group, a cyclic alkyl group, a substituted cyclic alkyl group, or a multiple ring system; and
R$^6$ and R$^7$ are independently absent, hydrogen, halogen, a heteroatom, a hydrocarbyl group, or a heteroatom containing group,
wherein the fluorided silica has not been calcined at a temperature of 400° C. or more.

2. The catalyst system of claim 1, wherein the fluorided support consists of fluorided silica.

3. The catalyst system of claim 2, wherein the fluorided silica has been calcined at a temperature of from about 150° C. to about 350° C.

4. The catalyst system of claim 1, wherein M is a group 4, 5, or 6 transition metal; each X is independently hydrogen, halogen, or a hydrocarbyl group; R$^1$ and R$^2$ are independently a C$_1$ to C$_6$ hydrocarbon group; m is 0, −1, −2, or −3 and n is +3, +4, or +5; R$^4$ and R$^5$ are independently a hydrocarbon group having up to 20 carbon atoms or an aryl group or an aralkyl group.

5. The catalyst system of claim 1, wherein R$^3$ is absent, hydrogen, or methyl.

6. The catalyst system of claim 1, wherein R$^4$ and R$^5$ are independently a group represented by the following formula:

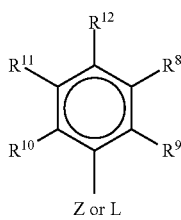

wherein:
each R$^8$ to R$^{12}$ are independently hydrogen, or a C$_1$ to C$_{20}$ alkyl group, a heteroatom, or a heteroatom containing group having up to 40 carbon atoms, and any two R groups can combine to form a cyclic group or a heterocyclic group and "Z or L" indicates a bond to Z or L in Formula I.

7. The catalyst system of claim 6, wherein R$^8$ is methyl, ethyl, propyl or butyl and/or R$^9$ is methyl, ethyl, propyl, or butyl, and/or R$^{10}$ is methyl, ethyl, propyl or butyl and/or R$^{11}$ is methyl, ethyl, propyl, or butyl and/or R$^{12}$ is methyl, ethyl, propyl, or butyl.

8. The catalyst system of claim 6, wherein R$^9$, R$^{10}$, and R$^{12}$ are methyl and R$^8$ and R$^{11}$ are hydrogen.

9. The catalyst system of claim 1, wherein the activator comprises alkyl aluminum compounds, alumoxanes, modified alumoxanes, non-coordinating anions, boranes, borates, and/or ionizing compounds.

10. The catalyst system of claim 1, wherein the catalyst system is spray dried.

11. The catalyst system of claim 1, wherein the at least a first catalyst compound and/or the activator are placed on the fluorided silica support.

12. The catalyst system of claim 1, further comprising a metal stearate.

13. The catalyst system of claim 1, wherein the fluorided support is represented by the formula: Sup-F, where "Sup" is silica, and "F" is a fluorine atom bound to the support.

14. The catalyst system of claim 1, wherein the fluorided support is represented by the formula: Sup-LF$_n$, where "Sup" is silica; "L" is a first member selected from the group consisting of (i) bonding, sufficient to bound the F to the Sup; (ii) B, Ta, Nb, Ge, Ga, Sn, Si, P, Ti, Mo, Re, Al, or Zr bound to the Sup and to the F; and (iii) O bound to the Sup and bound to a second member selected from the group consisting of B, Ta, Nb, Ge, Ga, Sn, Si, P, Ti, Mo, Re, Al, or Zr which is bound to the F; "F" is a fluorine atom; and "n" is a number from 1-7.

15. A polymerization process comprising contacting one or more olefins with the catalyst system of claim 1 at a temperature, a pressure, and for a period of time sufficient to produce a polyolefin.

16. The polymerization process of claim 15, wherein the one or more olefins comprises ethylene and/or propylene.

17. The polymerization process of claim 15, wherein the polyolefin produced has a molecular weight of 200,000 g/mol or more.

18. The polymerization process of claim 15, wherein the polymerization process occurs in a gas phase at a reactor temperature of 30° C. to 120° C.

19. The polymerization process of claim 15, wherein the polymerization process occurs in the slurry phase as particle form polymerization at a temperature of 85° C. to 110° C.

20. A process to produce a film comprising extruding, blowing or casting a film from polyolefin produced by the process of claim 15.

21. The polymerization process of claim 15, wherein the polymerization process occurs in the gas phase.

22. The polymerization process of claim 15, wherein the polymerization process occurs in the slurry phase.

23. A polymerization process comprising contacting one or more olefins comprising ethylene with the catalyst system of claim 1 at a temperature, a pressure, and for a period of time sufficient to produce a polyolefin.

24. The process of claim 23, wherein the polyolefin comprises at least 50 mol % of polymer units derived from ethylene.

25. The process of claim 23, wherein the polyolefin has an Mn of 250 g/mol to 100,000 g/mol.

26. The process of claim 23, wherein the polyolefin comprises 0.1 to less than 50 mole % polymer units derived from 1-hexene.

27. A catalyst system comprising the reaction product of: 1) a fluorided support consisting essentially of fluorided silica, 2) an activator and 3) at least a first catalyst compound of Formula I:

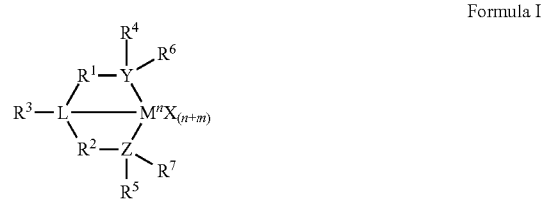

Formula I wherein:
M is a group 3 to 14 metal;
each X is independently an anionic leaving group;
n is the formal oxidation state of M;
m is the formal charge of the ligand comprising Y, Z, and L;
Y is a group 15 element;
Z is a group 15 element;
L is a group 15 or 16 element;
$R^1$ and $R^2$ are independently a $C_1$ to $C_{20}$ hydrocarbon group, a heteroatom containing group, silicon, germanium, tin, lead, or phosphorus;
$R^1$ and $R^2$ may also be interconnected to each other;
$R^3$ is absent, or is hydrogen, a group 14 atom containing group, a halogen, or a heteroatom containing group;
$R^4$ and $R^5$ are independently an aryl group, a substituted aryl group, a cyclic alkyl group, a substituted cyclic alkyl group, or a multiple ring system; and
$R^6$ and $R^7$ are independently absent, hydrogen, halogen, a heteroatom, a hydrocarbyl group, or a heteroatom containing group, said catalyst system, further comprising a second catalyst compound according to Formula 1.

28. A catalyst system comprising the reaction product of: 1) a fluorided silica support, 2) an activator and 3) a first catalyst compound, 4) and a second catalyst compound, wherein the first catalyst compound comprises a compound according to Formula II or IIa and the second catalyst compound a compound according to Formula III or IIIa:

Formula II

Ph(CH₃)₅
  \
   N
  / \
 /   \
H—N   ZrCl₂
 \   /
  \ /
   N
   |
   Ph(CH₃)₅,

Formula III

[structure with mesityl groups, ZrCl₂, and diamine backbone]

where Formula IIa is the same as Formula II except that the Zr is replaced with Hf and Formula IIIa is the same as Formula III except that the Zr is replaced with Hf.

29. A catalyst system comprising the reaction product of: 1) a fluorided silica support, 2) an activator and 3) a first catalyst compound, and 4) a second catalyst compound wherein the first compound is represented by Formula I:

Formula I $$R^3-L\begin{array}{c}R^1-Y\stackrel{R^4}{\underset{R^6}{\diagdown}}\\[2pt]R^2-Z\stackrel{}{\underset{R^5}{\diagdown}}R^7\end{array}M^nX_{(n+m)}$$

wherein:
M is a group 3 to 14 metal;
each X is independently an anionic leaving group;
n is the formal oxidation state of M;
m is the formal charge of the ligand comprising Y, Z, and L;
Y is a group 15 element;
Z is a group 15 element;
L is a group 15 or 16 element;
$R^1$ and $R^2$ are independently a $C_1$ to $C_{20}$ hydrocarbon group, a heteroatom containing group, silicon, germanium, tin, lead, or phosphorus;
$R^1$ and $R^2$ may also be interconnected to each other;
$R^3$ is absent, or is hydrogen, a group 14 atom containing group, a halogen, or a heteroatom containing group;
$R^4$ and $R^5$ are independently an aryl group, a substituted aryl group, a cyclic alkyl group, a substituted cyclic alkyl group, or a multiple ring system; and
$R^6$ and $R^7$ are independently absent, hydrogen, halogen, a heteroatom, a hydrocarbyl group, or a heteroatom containing group, and the second catalyst compound comprises a compound according to Formula IV:

Formula IV

[structure showing bis-phenoxy-imine/amine type complex with substituents $R^1$–$R^6$, $R^{12}$–$R^{17}$, $R^{*1}$, $R^{*2}$, $N^1$, $N^2$, Y, M, O, $X^1$, $X^2$]

wherein:
each solid line represents a covalent bond and each dashed line represents a coordinative link;
wherein M is a Group 3, 4, 5, or 6 transition metal; $N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided that when M is trivalent $X^2$ is not present;
each $R^1$, $R^2$, $R^3$, $R^4$, $R^5$, $R^6$, $R^{12}$, $R^{13}$, $R^{14}$, $R^{15}$, $R^{16}$, and $R^{17}$ is, independently, hydrogen, a $C_1$ to $C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;
$R^{*1}$ and $R^{*2}$ are independently a hydrogen, a $C_1$ to $C_1$ hydrocarbyl radical, a functional group comprising elements from Group 13 to 17 of the periodic table of the elements, or two or more of $R^{*1}$, $R^{*2}$, $R^1$ to $R^6$, and $R^{12}$ to $R^{17}$ may independently join together to form a $C_4$ to $C_{62}$ cyclic or polycyclic ring structure;

wherein at least one of $R^{*1}$ and $R^{*2}$ independently comprises a bulky functional group, an electron withdrawing group, or a combination thereof; and Y is a divalent $C_1$ to $C_{20}$ hydrocarbylene radical.

30. A method of preparing a fluorided silica supported catalyst system comprising combining a fluoride compound with water, then combining with a slurry of non-polar solvent and support consisting essentially of silica, removing the non-polar solvent to form a fluorided silica support, thereafter combining the fluoride silica support with a second solvent, which may be the same as or different from the non-polar solvent, and two catalyst compounds and activator, wherein the fluorided silica support is calcined at a temperature from 100° to less than 400° C., before or after combination with the activator and/or catalyst compounds.

31. The method of claim 30, wherein a ratio (by weight) of water to non-polar solvent is between 1:10 to 1:1000; the non-polar solvent is toluene, pentane, hexane, benzene, or chloroform; the fluoride compound is one or more of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_2$, $SF_6$, $ClF_3$, $ClF_5$, $BrF_5$, $IF_7$, $NF_3$, $HF$, $BF_3$, $NHF_2$ or $NH_4HF_2$.

32. The process of claim 30, wherein a ratio (by weight) of water to non-polar solvent is between 1:10 to 1:1000.

33. The process of claim 30, wherein the non-polar solvent is toluene, pentane, hexane, benzene, or chloroform.

34. The process of claim 30, wherein the fluoride compound comprises ammonium hexafluorosilicate, ammonium tetrafluoroborate, or a mixture thereof.

35. The process of claim 26, wherein further comprising spray-drying the catalyst system.

36. The method of claim 30 wherein a first catalyst compound of the two catalyst compounds is represented by Formula I:

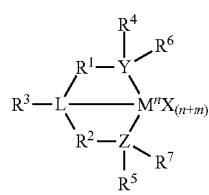

Formula I wherein:
M is a group 3 to 14 metal;
each X is independently an anionic leaving group;
n is the formal oxidation state of M;
m is the formal charge of the ligand comprising Y, Z, and L;
Y is a group 15 element;
Z is a group 15 element;
L is a group 15 or 16 element;
$R^1$ and $R^2$ are independently a $C_1$ to $C_{20}$ hydrocarbon group, a heteroatom containing group, silicon, germanium, tin, lead, or phosphorus;
$R^1$ and $R^2$ may also be interconnected to each other;
$R^3$ is absent, or is hydrogen, a group 14 atom containing group, a halogen, or a heteroatom containing group;
$R^4$ and $R^5$ are independently an aryl group, a substituted aryl group, a cyclic alkyl group, a substituted cyclic alkyl group, or a multiple ring system; and
$R^6$ and $R^7$ are independently absent, hydrogen, halogen, a heteroatom, a hydrocarbyl group, or a heteroatom containing group.

37. A method of preparing a fluorided silica supported catalyst system comprising combining a fluoride compound with water, then combining with a slurry of non-polar solvent and support consisting essentially of silica, removing the non-polar solvent to form a fluorided silica support, thereafter combining the fluoride silica support with a second solvent, which may be the same as or different from the non-polar solvent, and two catalyst compounds and activator, wherein the fluorided silica support is calcined at a temperature from 100° to less than 400° C., before or after combination with the activator and/or catalyst compounds wherein a first catalyst compound of the two catalyst compounds is represented by Formula I:

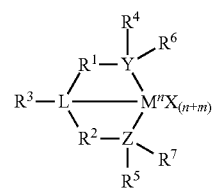

Formula I wherein:
M is a group 3 to 14 metal;
each X is independently an anionic leaving group;
n is the formal oxidation state of M:
m is the formal charge of the ligand comprising Y, Z, and L;
Y is a group 15 element;
Z is a group 15 element:
L is a group 15 or 16 element;
$R^1$ and $R^2$ are independently a $C_1$ to $C_{20}$ hydrocarbon group, a heteroatom containing group, silicon, germanium, tin, lead, or phosphorus;
$R^1$ and $R^2$ may also be interconnected to each other;
$R^3$ is absent, or is hydrogen, a group 14 atom containing group, a halogen, or a heteroatom containing group;
$R^4$ and $R^5$ are independently an aryl group, a substituted aryl group, a cyclic alkyl group, a substituted cyclic alkyl group, or a multiple ring system; and
$R^6$ and $R^7$ are independently absent, hydrogen, halogen, a heteroatom, a hydrocarbyl group, or a heteroatom containing group and a second catalyst compound of the two catalyst compounds is represented by Formula IV:

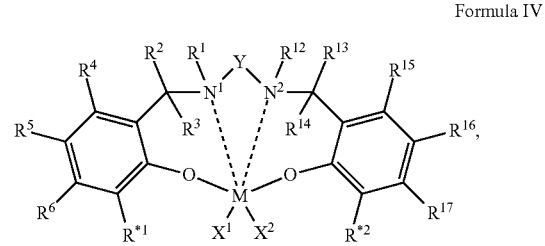

Formula IV wherein:

each solid line represents a covalent bond and each dashed line represents a coordinative link;

wherein M is a Group 3, 4, 5, or 6 transition metal; $N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided that when M is trivalent $X_2$ is not present;

each $R^1$, $R^2$, $R^3$, $R^4$, $R^5$, $R^6$, $R^{12}$, $R^{13}$, $R^{14}$, $R^{15}$, $R^{16}$, and $R^{17}$ is, independently, hydrogen, a $C_1$ to $C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;

or more of $R^{*1}$, $R^{*2}$, and $R^1$ to $R^{17}$ may independently join together to form a $C_4$ to $C_{62}$ cyclic or polycyclic ring structure;

wherein at least one of $R^{*1}$ and $R^{*2}$ independently comprises a bulky functional group, an electron withdrawing group, or a combination thereof; and Y is a divalent $C_1$ to $C_{20}$ hydrocarbylene radical.

* * * * *